United States Patent
Brijwani et al.

(10) Patent No.: US 11,812,772 B2
(45) Date of Patent: *Nov. 14, 2023

(54) MOUTHFEEL MODULATION IN REDUCED AND SUGAR-FREE BEVERAGES USING A BLEND OF PECTIN AND XANTHAN GUM

(71) Applicant: PepsiCo, Inc., Purchase, NY (US)

(72) Inventors: Khushal Brijwani, Elmsford, NY (US); William Mutilangi, Croton-on-Hudson, NY (US)

(73) Assignee: PepsiCo, Inc., Purchase, NY (US)

(*) Notice: Subject to any disclaimer, the term of this patent is extended or adjusted under 35 U.S.C. 154(b) by 171 days.

This patent is subject to a terminal disclaimer.

(21) Appl. No.: 17/245,837

(22) Filed: Apr. 30, 2021

(65) Prior Publication Data

US 2021/0315247 A1 Oct. 14, 2021

Related U.S. Application Data

(63) Continuation of application No. 15/807,294, filed on Nov. 8, 2017, now Pat. No. 11,019,837.

(51) Int. Cl.
| | | |
|---|---|---|
| A23L 29/231 | (2016.01) | |
| A23L 29/269 | (2016.01) | |
| A23L 27/30 | (2016.01) | |
| A23L 2/60 | (2006.01) | |
| A23F 3/16 | (2006.01) | |
| A23F 5/24 | (2006.01) | |
| A23G 9/34 | (2006.01) | |
| A23C 11/10 | (2021.01) | |
| A23L 11/65 | (2021.01) | |

(52) U.S. Cl.
CPC .......... *A23L 29/231* (2016.08); *A23C 11/103* (2013.01); *A23F 3/163* (2013.01); *A23F 5/243* (2013.01); *A23G 9/34* (2013.01); *A23L 2/60* (2013.01); *A23L 11/65* (2021.01); *A23L 27/33* (2016.08); *A23L 29/27* (2016.08); *A23V 2002/00* (2013.01)

(58) Field of Classification Search
CPC ........ A23L 29/231; A23L 29/27; A23L 27/33; A23L 2/60; A23V 2002/00
USPC ......................................................... 426/577
See application file for complete search history.

(56) References Cited

U.S. PATENT DOCUMENTS

| | | | |
|---|---|---|---|
| 4,737,374 A | 4/1988 | Huber | |
| 4,830,862 A | 5/1989 | Braun et al. | |
| 4,925,686 A | 5/1990 | Kastin | |
| 5,529,796 A | 6/1996 | Gobbo | |
| 6,458,395 B1 | 10/2002 | Emoto | |
| 6,485,945 B1 | 11/2002 | Potter | |
| 7,052,725 B2 | 5/2006 | Chang et al. | |
| 7,229,658 B1 | 6/2007 | Inoue et al. | |
| 7,815,956 B2 | 10/2010 | Lee et al. | |
| 8,877,922 B2 | 11/2014 | Tachdjian | |
| 8,877,992 B2 | 11/2014 | Appel et al. | |
| 9,060,537 B2 | 6/2015 | Mutilangi | |
| 2004/0265464 A1 | 12/2004 | Bernardini et al. | |
| 2011/0070336 A1 | 3/2011 | Mutilangi | |
| 2011/0212246 A1 | 9/2011 | Debon et al. | |
| 2013/0171315 A1* | 7/2013 | Delfosse | A23L 33/21 426/548 |
| 2013/0259973 A1 | 10/2013 | Valdez et al. | |
| 2013/0344147 A1 | 12/2013 | Kainose | |
| 2014/0093630 A1 | 4/2014 | Shigemura et al. | |
| 2014/0094453 A1 | 4/2014 | Tachdjian et al. | |
| 2014/0193469 A1 | 7/2014 | Chen | |
| 2014/0212564 A1 | 7/2014 | Zhang | |
| 2014/0271996 A1 | 9/2014 | Prakash et al. | |
| 2014/0272068 A1 | 9/2014 | Prakash et al. | |
| 2015/0216217 A1 | 8/2015 | Devaux et al. | |
| 2016/0106125 A1 | 4/2016 | Rascon | |
| 2016/0286838 A1 | 10/2016 | Ramakrishna et al. | |
| 2018/0092381 A1 | 4/2018 | Brijwani et al. | |

FOREIGN PATENT DOCUMENTS

| | | | |
|---|---|---|---|
| CN | 104719479 A | 6/2015 | |
| EP | 2700321 A1 | 2/2014 | |
| JP | 405015319 | 1/1993 | |
| JP | H10-120704 A | 5/1998 | |
| WO | WO-9934690 A1 | 7/1999 | |
| WO | WO-0024273 A1 | 5/2000 | |
| WO | WO 01/11988 A2 | 2/2001 | |
| WO | WO-0196404 A2 | 12/2001 | |
| WO | WO 2004/110168 A1 | 12/2004 | |
| WO | WO-2004110168 A1 * | 12/2004 | ........... A23C 9/1544 |
| WO | WO-2010057024 A1 | 5/2010 | |
| WO | WO-2014029857 A1 | 2/2014 | |
| WO | WO 2016/040577 A1 | 3/2016 | |

(Continued)

OTHER PUBLICATIONS

JP 405015319—English Abstract (Year: 1993).*
Voragen, A.G. J., et al., "Determination of the degree of methylation and acetylation of pectins by h.p.l.c.," Food Hydrocolloids, vol. 1(1): 65-70 (1986).
International Search Report and Written Opinion for International Application No. PCT/US2018/059682, International Search Authority, Alexandria, V.A., United States, dated Feb. 5, 2019, 10 pages.
Harding, Stephen E., et al. "The molecular weight distribution and conformation of citrus pectins in solution studied by hydrodynamics." Carbohydrate Polymers 16(1): 1-15, Elsevier, Netherlands (1991).

(Continued)

*Primary Examiner* — Hamid R Badr

(74) *Attorney, Agent, or Firm* — Sterne, Kessler, Goldstein & Fox P.L.L.C.

(57) ABSTRACT

This disclosure provides novel beverage compositions comprising a pectin, a first xanthan gum, and optionally a second xanthan gum. The beverage compositions are useful for improving mouthfeel properties of non-nutritive sweeteners such as steviol glycosides and blends thereof, in food and beverages containing the same.

20 Claims, 20 Drawing Sheets

(56) References Cited

FOREIGN PATENT DOCUMENTS

WO    WO 2016/071463 A1    5/2016

OTHER PUBLICATIONS

Garcia-Ochoa, F., et al. "Xanthan gum: production, recovery, and properties." Biotechnology advances 18(7): 549-579, Elsevier, Netherlands (2000).

Office Action dated Jul. 8, 2019, in U.S. Appl. No. 15/807,294, Bruwani, K. et al., filed Nov. 8, 2017, 8 pages.

Office Action dated Dec. 13, 2019, in U.S. Appl. No. 15/807,294, Bruwani, K. et al., filed Nov. 8, 2017, 10 pages.

Office Action dated May 18, 2020, in U.S. Appl. No. 15/807,294, Bruwani, K. et al., filed Nov. 8, 2017, 16 pages.

Faria, S., et al., "Characterization of xanthan gum produced from sugar cane broth," Carbohydrate Polymers 86(2):469-476, Elsevier Ltd., United Kingdom (Apr. 2011).

Fishman, M., et al., "Intrinsic viscosity and molecular weight of pectin components," Carbohydrate Research 215(1):91-104, Pergamon Press, United Kingdom (Aug. 1991).

Karaman, S., et al., "Rheological and some Physicochemical Properties of Selected Hydrocolloids and their Interactions with Guar Gum: Characterization using Principal Component Analysis and Viscous Synergism Index," International Journal of Food Properties 17(8):1655-1667, Taylor and Francis Ltd., United States (Sep. 2014).

Chemical Encyclopedia, vol. 16, pp. 688-689, Editorial Committee of Chemical Encyclopedia, Editorial Office of Chemical Encyclopedia in Chemical Industry Press, (Dec. 1997).

Clark et al., "A Fresh Look at Using Gums to Formulate Reduced Sugar Beverages," China Food Additive, pp. 103-106, China's National Health Commission, China (Nov. 2013).

Tongyi, Cai, "Principles and Techniques of Fruits and Vegetables Processing," pp. 170-172, China Agricultural University Press, China (Nov. 1987).

\* cited by examiner

Figure 5

| No. | Run Order | Apple Pectin (APec) (ppm) | Citrus Peel Pectin (CPPec) (ppm) | Pectin Citrus (PEC90) (ppm) | Pectin Citrus (PEC60) (ppm) | Xanthan XLM (ppm) | Xanthan XMM (ppm) | Xanthan (XDI) (ppm) | Xanthan (XMAS) (ppm) | Friction Coefficient | Viscosity |
|---|---|---|---|---|---|---|---|---|---|---|---|
| 10 | 7  | 500  | 500  | 500  | 500  | 300 | 300 | 300 | 300 | 0.122767 | 5.01603 |
| 11 | 2  | 1000 | 500  | 500  | 500  | 300 | 800 | 800 | 500 | 0.11856  | 10.1 |
| 12 | 11 | 500  | 1000 | 500  | 500  | 800 | 300 | 800 | 500 | 0.131167 | 11.8333 |
| 13 | 4  | 1000 | 1000 | 500  | 500  | 800 | 800 | 300 | 300 | 0.088544 | 11.3237 |
| 14 | 5  | 500  | 500  | 1000 | 500  | 800 | 800 | 800 | 300 | 0.042078 | 12.9967 |
| 15 | 6  | 1000 | 500  | 1000 | 500  | 800 | 300 | 300 | 500 | 0.062831 | 9.3973 |
| 16 | 17 | 500  | 1000 | 1000 | 500  | 300 | 800 | 300 | 500 | 0.163619 | 9.28173 |
| 17 | 18 | 1000 | 1000 | 1000 | 500  | 300 | 300 | 800 | 300 | 0.124886 | 7.9215 |
| 18 | 19 | 500  | 500  | 500  | 1000 | 800 | 800 | 300 | 500 | 0.166811 | 12.845 |
| 19 | 15 | 1000 | 500  | 500  | 1000 | 800 | 300 | 800 | 300 | 0.068031 | 11.0433 |
| 20 | 1  | 500  | 1000 | 500  | 1000 | 300 | 800 | 800 | 300 | 0.046447 | 10.677 |
| 21 | 13 | 1000 | 1000 | 500  | 1000 | 300 | 300 | 300 | 500 | 0.114586 | 8.41963 |
| 22 | 3  | 500  | 500  | 1000 | 1000 | 300 | 300 | 800 | 500 | 0.071411 | 9.04833 |
| 23 | 14 | 1000 | 500  | 1000 | 1000 | 300 | 800 | 300 | 300 | 0.045469 | 9.31793 |
| 24 | 8  | 500  | 1000 | 1000 | 1000 | 800 | 300 | 300 | 300 | 0.040214 | 10.3677 |
| 25 | 10 | 1000 | 1000 | 1000 | 1000 | 800 | 800 | 800 | 500 | 0.049181 | 16.3217 |
| 26 | 12 | 750  | 750  | 750  | 750  | 550 | 550 | 550 | 400 | 0.123236 | 11.4573 |
| 27 | 9  | 750  | 750  | 750  | 750  | 550 | 550 | 550 | 400 | 0.064111 | 10.886 |
| 28 | 16 | 750  | 750  | 750  | 750  | 550 | 550 | 550 | 400 | 0.127875 | 10.0393 |

MOUTHFEEL MODULATION IN REDUCED AND SUGAR-FREE BEVERAGES USING A BLEND OF PECTIN AND XANTHAN GUM

FIELD

The present disclosure is directed to a composition having improved mouthfeel and methods of improving mouthfeel in a beverage, and food and beverages containing the same.

BACKGROUND

Nutritive sweeteners such as sucrose or high fructose corn syrup (HFCS) impart sweetness and rich mouthfeel to beverages. However, when sugar is wholly or partially replaced with one or more high intensity non-nutritive sweeteners, there is an undesirable change in mouthfeel.

Food and beverage manufacturers have attempted to improve mouthfeel and flavor profiles of non-nutritive sweeteners using taste masking or taste altering agents. For example, WO 01/11988 discloses a method of altering or modifying sensory qualities, including mouthfeel, of artificial or high intensity sweetener compositions by adding an effective amount of a plant-derived polymeric polyphenol material.

Despite the disclosure of WO 01/11988, there is still a need for compositions and methods suitable for improving the mouthfeel of beverages and foods containing non-nutritive sweeteners.

BRIEF SUMMARY

The present disclosure is directed to a composition having improved mouthfeel comprising blends of pectin and xanthan gum, and methods of improving mouthfeel in a beverage. The compositions can be used in various products, including beverages, beverage concentrates, and food products. In certain embodiments, the composition can be added to beverage or food products.

In some embodiments, the present disclosure is directed to a composition comprising a pectin having an average molecular weight ranging from about 50,000 Daltons (Da) to about 400,000 Da; and a first xanthan gum having an average molecular weight ranging from about 3,000,000 Da to about 35,000,000 Da. In some embodiments, the pectin is selected from the group consisting of apple pectins, citrus pectins, grape pectins, and carrot pectins. In particular embodiments, the pectin is apple pectin.

In some embodiments, the first xanthan gum is selected from the group consisting of xanthan XLM, xanthan XMM, xanthan XHM, xanthan XDI, and xanthan XMAS. In particular embodiments, the first xanthan gum is selected from the group consisting of xanthan XMM and xanthan XMAS.

In some embodiments, the pectin has a degree of esterification ranging from about 50% to about 99%. In other embodiments, the pectin has a degree of esterification ranging from about 80% to about 99%.

In some embodiments, the pectin is present in the composition at a concentration ranging from about 50 ppm to about 4000 ppm. In other embodiments, the pectin is present in the composition at a concentration ranging from about 50 ppm to about 1000 ppm.

In some embodiments, the first xanthan gum is present in the composition at a concentration ranging from about 0.01 ppm to about 3000 ppm. In other embodiments, the first xanthan gum is present in the composition at a concentration ranging from about 0.01 ppm to about 1000 ppm.

In some embodiments, the first xanthan gum has an average molecular weight ranging from about 6,000,000 Da to about 10,000,000 Da. In other embodiments, the first xanthan gum has an average molecular weight ranging from about 25,000,000 Da to about 40,000,000 Da.

In certain embodiments, the composition of the present disclosure further comprises a second xanthan gum, wherein the second xanthan gum has an average molecular weight ranging from about 25,000,000 Da to about 40,000,000 Da.

In some embodiments, the pectin has an average molecular weight ranging from about 50,000 Da to about 300,000 Da. In other embodiments, the pectin has an average molecular weight ranging from about 100,000 Da to about 200,000 Da.

In some embodiments, the composition comprises from about 100 ppm to about 300 ppm of a pectin; and from about 0.01 ppm to about 100 ppm of a first xanthan gum. In other embodiments, the composition comprises from about 100 ppm to about 300 ppm of a pectin; from about 0.01 ppm to about 100 ppm of a first xanthan gum; and from about 0.01 ppm to about 100 ppm of a second xanthan gum.

In some embodiments, the composition has a viscosity ranging from about 1.0 to about 1.5. In some embodiments, the composition has a coefficient of friction ranging from about 0.9 to about 1.4.

In some embodiments, the composition comprises a second pectin having an average molecular weight ranging from about 50,000 Da to about 400,000 Da.

In some embodiments, the composition is a beverage. In some embodiments, the beverage comprises a non-nutritive sweetener. In certain embodiments, the non-nutritive sweetener is selected from the group consisting of a steviol glycoside, Lo Han Guo sweetener, rubusoside, siamenoside, monatin, curculin, glycyrrhizic acid, neohesperidin, dihydrochalcone, glycyrrhizin, glycyphyllin, phloridzin, trilobatin, phyllodulcin, brazzein, hernandulcin, osladin, polypodoside A, baiyunoside, pterocaryoside A and B, mukurozioside, thaumatin, monellin, mabinlins I and II, phlomisoside I, periandrin I, abrusoside A, and cyclocarioside I, mogroside IV, mogroside V, or combinations thereof.

In some embodiments, the non-nutritive sweetener is a steviol glycoside. In particular embodiments, the steviol glycoside is selected from the group consisting of stevioside, rebaudioside A, rebaudioside B, rebaudioside C, rebaudioside D, rebaudioside E, rebaudioside F, rebaudioside G rebaudioside H rebaudioside I, rebaudioside J, rebaudioside K, rebaudioside L, rebaudioside M, rebaudioside N, rebaudioside O, rebaudioside P, rebaudioside Q, steviolbioside, dulcoside A, and combinations thereof.

In some embodiments, the beverage is a carbonated beverage, a non-carbonated beverage, a fountain beverage, a frozen beverage, a frozen carbonated beverage, a fruit juice, a fruit juice-flavored drink, a fruit-flavored drink, a cola beverage, a sports drink, an energy drink, a fortified/enhanced water drink, a flavored water, a soy drink, a vegetable drink, a grain-based drink, a malt beverage, a fermented drink, a yogurt drink, kefir, a coffee beverage, a tea beverage, a dairy beverage, a smoothie drink, a caffeinated energy drink, or an alcoholic beverage.

In some embodiments, the present disclosure is directed to a method for improving mouthfeel of a beverage, comprising adding to the beverage a pectin having an average molecular weight ranging from about 50,000 Da to about 400,000 Da; and a first xanthan gum having an average molecular weight ranging from about 3,000,000 Da to about 35,000,000 Da.

BRIEF DESCRIPTION OF THE DRAWINGS/FIGURES

The foregoing summary, as well as the following detailed description of the embodiments, will be better understood when read in conjunction with the appended figures. For the purpose of illustration, the figures may describe the use of specific embodiments. It should be understood, however, that the compounds, formulations, compositions, and methods described herein are not limited to the precise embodiments discussed or described in the figures.

FIG. 5 is a table showing the coefficient of friction and viscosity of aqueous samples containing different concentrations of pectins and xanthan gums.

DETAILED DESCRIPTION

Figure 1:
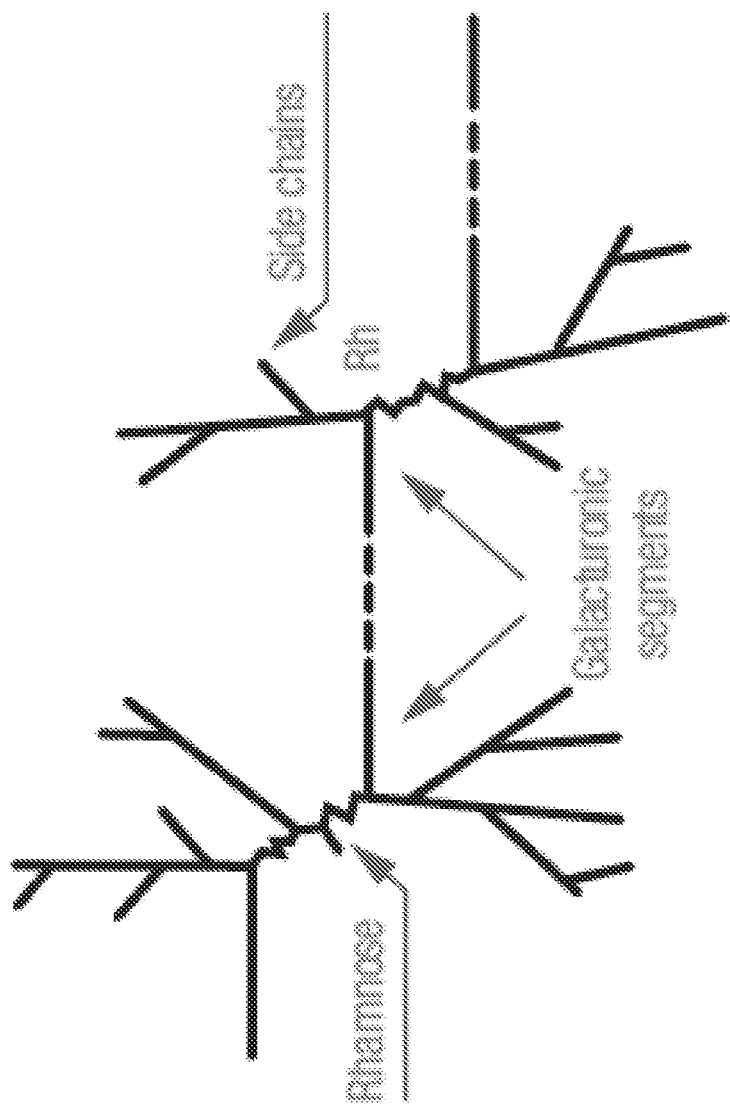
FIG. 1 depicts a general structure for the pectins disclosed herein.

Potent non-nutritive sweeteners, including steviol glycosides, often have undesirable mouthfeel properties. It has now been unexpectedly discovered that these undesirable mouthfeel properties including, but not limited to, watered-down, thin, and low flavor perception can be improved by a composition comprising a pectin having an average molecular weight ranging from about 50,000 Daltons (Da) to about 400,000 Da, and a first, and optionally a second, xanthan gum each having an average molecular weight ranging from about 3,000,000 Da to about 35,000,000 Da.

Definitions

Various embodiments of the compositions and methods disclosed herein are possible and will be apparent to the person of ordinary skill in the art, given the benefit of this disclosure. In this disclosure reference to "some embodiments," "certain embodiments," "particular embodiments" and similar phrases each means that those embodiments are non-limiting examples of the subject matter described herein.

The articles "a," "an," and "the" are used herein to refer to one or to more than one (that is, at least one) of the grammatical object of the article. By way of example, "a compound" means one compound or more than one compound.

The term "about" is used throughout this disclosure and the appended claims to account for ordinary inaccuracy and variability, such as in measurement, testing and the like. As used herein, the term "about" can mean±10% of the noted value. By way of example only, a composition comprising "about 30 ppm" of a compound could include from 27 ppm of the compound up to and including 33 ppm of the compound.

The terms "treated water," "purified water," "demineralized water," "distilled water," and "r-o water" are understood to be generally synonymous, and refer to water from which substantially all mineral content has been removed, typically containing no more than about 500 ppm total dissolved solids, such as 250 ppm total dissolved solids. Methods of producing treated water are known to those of ordinary skill in the art and include deionization, distillation, filtration and reverse osmosis ("r-o"), among others, for example, as disclosed in U.S. Pat. No. 7,052,725.

As used herein, "taste" refers to a combination of sweetness perception, temporal effects of sweetness perception (on-set and duration), off-tastes, such as bitterness and metallic taste, residual perception (aftertaste), and tactile perception, such as body and thickness.

As used herein, "mouthfeel" refers to physical sensations in the mouth produced by a food or beverage, including, but not limited to, heaviness, thickness, viscosity, wetness, smoothness, and mouth coating.

The term "nutritive sweetener" refers to sweeteners that provide significant caloric content in typical usage amounts, such as more than about 5 calories per 8 oz. serving of a beverage.

As used herein, the term "non-nutritive sweetener" refers to all sweeteners other than nutritive sweeteners.

The term "concentrate" is used throughout the specification and refers to compositions suitable for use in beverage or food products.

The term "pectin" refers to a polysaccharide that is present in fruits and vegetables and that has galacturonic acid segments with rhamnose side chains. Exemplary pectins include, but are not limited to, apple pectins, citrus pectins, grape pectins, carrot pectins, and combinations thereof.

Figure 2:
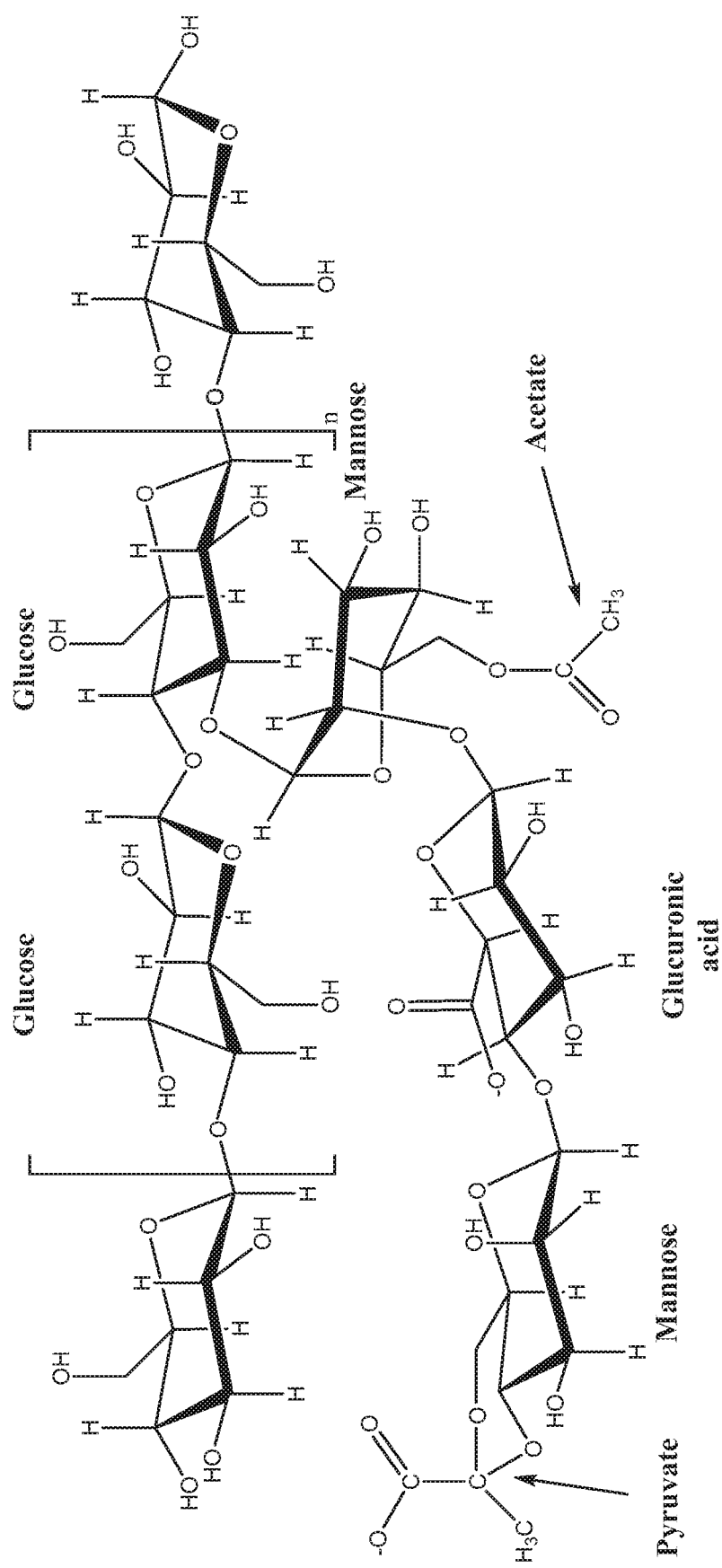
FIG. 2 depicts a general structure for the xanthan gums disclosed herein.

The phrase "degree of esterification" (DE) refers to the amount or percentage of esterified galacturonic acid units within a pectin structure. The galacturonic acid esters can be, for example, methyl esters, ethyl esters, propyl esters, etc. In typical embodiments, the galacturonic acid esters are methyl esters The phrase "xanthan gum" refers to polysaccharides with a β-(1,4) linked glucan backbone with side chains comprising glucaronic acid between two mannose groups. A general structure for a xanthan gum as disclosed herein is shown in FIG. 2.

The phrase "apple pectin" refers to pectins obtained from apples.

The terms "citrus pectin DE 60%" (PEC60) refers to pectins obtained from citrus sources. The pectins typically have a degree of esterification ranging from about 55% to about 70%.

The terms "citrus pectin DE 90%" (PEC90) refers to pectins obtained from citrus sources. These pectins typically have a degree of esterification greater than about 85%.

Compositions

In certain embodiments, the present disclosure provides a composition comprising a pectin and a first xanthan gum. In certain embodiments, the composition can further comprise a second xanthan gum. In some embodiments, the composition comprising a pectin and a first xanthan gum and/or the composition comprising a pectin, a first xanthan gum, and a second xanthan gum can also comprise water.

In some embodiments, the pectin in the composition can have an average molecular weight ranging from about 10,000 Da to about 1,000,000 Da. In other embodiments, the pectin can have an average molecular weight ranging from about 20,000 Da to about 800,000 Da, from about 30,000 Da to about 600,000 Da, from about 40,000 Da to about 500,000 Da, from about 50,000 Da to about 400,000 Da, from about 50,000 Da to about 300,000 Da, from about 60,000 Da to about 280,000 Da, from about 70,000 Da to about 260,000 Da, from about 80,000 Da to about 240,000 Da, from about 90,000 Da to about 220,000 Da, from about 100,000 Da to about 200,000 Da, from about 110,000 Da to about 190,000 Da, from about 120,000 Da to about 180,000 Da, from about 130,000 Da to about 170,000 Da, or from about 140,000 Da to about 160,000 Da. In particular embodiments, the pectin has an average molecular weight of about 100,000 Da, about 110,000 Da, about 120,000 Da, about 130,000 Da, about 140,000 Da, about 150,000 Da, about 160,000 Da, about 170,000 Da, about 180,000 Da, about 190,000 Da, or about 200,000 Da.

In some embodiments, the pectin can be present in the composition in an amount ranging from about 1 ppm to about 10,000 ppm. In other embodiments, the pectin can be present in an amount ranging from about 10 ppm to about 9000 ppm, from about 20 ppm to about 8000 ppm, from about 30 ppm to about 7000 ppm, from about 40 ppm to about 6000 ppm, from about 50 ppm to about 5000 ppm, from about 50 ppm to about 4000 ppm, from about 50 ppm to about 3000 ppm, from about 50 ppm to about 2000 ppm, from about 50 ppm to about 1000 ppm, from about 60 ppm to about 900 ppm, from about 70 ppm to about 800 ppm, from about 80 ppm to about 700 ppm, from about 90 ppm to about 600 ppm, from about 100 ppm to about 500 ppm, from about 100 ppm to about 400 ppm, or from about 100 ppm to about 300 ppm. In particular embodiments, the pectin can be present in an amount of about 50 ppm, about 60 ppm, about 70 ppm, about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, about 350 ppm, about 400 ppm, about 450 ppm, about 500 ppm, about 600 ppm, about 700 ppm, about 800 ppm, about 900 ppm, about 1000 ppm, about 1100 ppm, about 1200 ppm, about 1300 ppm, about 1400 ppm, about 1500 ppm, about 1600 ppm, about 1700 ppm, or about 1800 ppm.

In some embodiments, the pectin can have a degree of esterification ranging from about 40% to about 100%. In other embodiments, the pectin can have a degree of esterification ranging from about 45% to about 99%, about 50% to about 99%, about 55% to about 99%, about 60% to about 99%, about 65% to about 99%, about 70% to about 99%, about 75% to about 99%, about 80% to about 99%, or about 85% to about 99%. In particular embodiments, the pectin can have a degree of esterification of about 40%, about 45%, about 50%, about 55%, about 60%, about 65%, about 70%, about 75%, about 80%, about 85%, about 90%, about 95%, about 99%, or about 100%. In other embodiments, the pectin can have a degree of esterification of at least about 40%, at least about 45%, at least about 50%, at least about 55%, at least about 60%, at least about 65%, at least about 70%, at least about 75%, at least about 80%, at least about 85%, at least about 90%, at least about 95%, or at least about 99%.

Examples of pectins suitable for use in the composition can be selected from any known source of pectin, including, but not limited to, apple pectins, citrus pectins, grape pectins, carrot pectins, and combinations thereof.

In some embodiments, the pectin can be apple pectin and can have a degree of esterification of about 50% to about 60%, and in particular embodiments, of about 55%, or of about 55.4%. In other embodiments, the pectin can be citrus pectin and can have a degree of esterification of about 50% to about 60%, and in particular embodiments, of about 58%, or of about 58.4%. In further embodiments, the pectin can be citrus pectin and can have a degree of esterification of about 90%.

Exemplary commercially available pectins include, but are not limited to, apple pectin (SIGMA-ALDRICH, Prod. No. 93854), citrus peel pectin (SIGMA-ALDRICH, Prod. No. P9135), citrus pectin with a degree of esterification of 60% (SIGMA-ALDRICH, Prod. No. P9436), and citrus pectin with a degree of esterification of 90% (SIGMA-ALDRICH, Prod. No. P9561). Additional properties for these commercially available pectins, including average molecular weight and structural configuration, are listed below in Table 1. The molecular weights listed in Table 1 were determined in accordance with the procedures described in Example 1.

TABLE 1

| Pectin | Average Molecular Weight (Da) | Branching (per 1000 repeats) | Structural Configuration |
|---|---|---|---|
| Apple (APec) | 146,572 | N/A | Random Coil |
| Citrus Peel (CPPec) | 165,314 | N/A | Random Coil |
| Citrus DE 60% (PEC60) | 253,623 | N/A | Random Coil |
| Citrus DE 90% (PEC90) | 67,198 | N/A | Random Coil |

*The abbreviation "DE" in Table 1 indicates the degree of esterification of the listed pectin. The degree of esterification can be determined by any method known in the art, including, but not limited to, infrared (IR) spectroscopy. For example, the degree of esterification can be determined by using the methods disclosed in Voragen, A. G. J., et al., *Determination of the degree of methylation and acetylation of pectins by h.p.l.c.*, Food Hydrocolloids, 1(1), 65-70 (1986).

The first and optional second xanthan gums in the composition can each have an average molecular weight ranging from about 1,000,000 Da to about 50,000,000 Da. In other embodiments, the first and optional second xanthan gums can each have an average molecular weight ranging from about 2,000,000 Da to about 45,000,000 Da, from about 3,000,000 Da to about 40,000,000 Da, or from about 3,000,000 Da to about 35,000,000 Da.

In some embodiments, the first and optional second xanthan gums in the composition can each have an average molecular weight ranging from about 1,000,000 Da to about 20,000,000 Da. In other embodiments, the first and optional second xanthan gums can each have an average molecular weight ranging from about 2,000,000 Da to about 18,000,000 Da, from about 3,000,000 Da to about 16,000,000 Da, from about 4,000,000 Da to about 14,000,000 Da, from about 5,000,000 Da to about 14,000,000 Da, from about 6,000,000 Da to about 12,000,000 Da, from about 6,000,000 Da to about 10,000,000 Da, from about 7,000,000 Da to about 9,000,000 Da, or from about 8,000,000 Da to about 9,000,000 Da. In particular embodiments, the first and optional second xanthan gums can each have an average molecular weight of about 1,000,000 Da, about 2,000,000 Da, about 3,000,000 Da, about 4,000,000 Da, about 5,000,000 Da, about 5,500,000 Da, about 6,000,000 Da, about 6,500,000 Da, about 7,000,000 Da, about 7,500,000 Da, about 8,000,000 Da, about 8,500,000 Da, about 9,000,000 Da, about 9,500,000 Da, or about 10,000,000 Da.

In some embodiments, the first and optional second xanthan gums in the composition can each have an average molecular weight ranging from about 10,000,000 Da to about 100,000,000 Da. In other embodiments, the first and optional second xanthan gums can each have an average molecular weight ranging from about 15,000,000 Da to about 80,000,000 Da, from about 20,000,000 Da to about 60,000,000 Da, from about 25,000,000 Da to about 40,000,000 Da, from about 30,000,000 Da to about 35,000,000 Da, from about 31,000,000 Da to about 34,000,000 Da, or from about 32,000,000 Da to about 34,000,000 Da. In particular embodiments, the first and optional second xanthan gum can each have an average molecular weight of about 25,000,000 Da, about 26,000,000 Da, about 27,000,000 Da, about 28,000,000 Da, about 29,000,000 Da, about 30,000,000 Da, about 31,000,000 Da, about 32,000,000 Da, about 33,000,000 Da, about 34,000,000 Da, about 35,000,000 Da, about 36,000,000 Da, about 37,000,000 Da, about 38,000,000 Da, about 39,000,000 Da, or about 40,000,000 Da.

In some embodiments, the first and optional second xanthan gums can each be present in the composition in an amount ranging from about 0.01 ppm to about 10,000 ppm. In other embodiments, the first and optional second xanthan gums can each be present in an amount ranging from about 0.01 ppm to about 9000 ppm, from about 0.01 ppm to about 8000 ppm, from about 0.01 ppm to about 7000 ppm, from about 0.01 ppm to about 6000 ppm, from about 0.01 ppm to about 5000 ppm, from about 0.01 ppm to about 4000 ppm, from about 0.01 ppm to about 3000 ppm, from about 0.01 ppm to about 2000 ppm, from about 0.01 ppm to about 1000 ppm, from about 0.01 ppm to about 900 ppm, from about 0.01 ppm to about 800 ppm, from about 0.01 ppm to about 700 ppm, from about 0.01 ppm to about 600 ppm, from about 0.01 ppm to about 500 ppm, from about 0.01 ppm to about 600 ppm, from about 0.01 ppm to about 500 ppm, from about 0.01 ppm to about 400 ppm, from about 0.01 ppm to about 300 ppm, from about 0.01 ppm to about 200 ppm, or from about 0.01 ppm to about 100 ppm. In particular embodiments, the first and optional second xanthan gums can each be present in an amount of about 0.01 ppm, about 0.1 ppm, about 1 ppm, about 5 ppm, about 10 ppm, about 15 ppm, about 20 ppm, about 25 ppm, about 30 ppm, about 35 ppm, about 40 ppm, about 45 ppm, about 50 ppm, about 55 ppm, about 60 ppm, about 65 ppm, about 70 ppm, about 75 ppm, about 80 ppm, about 85 ppm, about 90 ppm, about 95 ppm, about 100 ppm, about 105 ppm, about 110 ppm, about 115 ppm, about 120 ppm, about 125 ppm, about 130 ppm, about 135 ppm, about 140 ppm, about 145 ppm, about 150 ppm, about 160 ppm, about 170 ppm, about 180 ppm, about 190 ppm, about 200 ppm, about 250 ppm, about 300 ppm, about 350 ppm, about 400 ppm, about 450 ppm, about 500 ppm, about 550 ppm, or about 600 ppm.

Exemplary xanthan gums suitable for use as the first and optional second xanthan gums include, but are not limited to, xanthan XLM (SIGMA-ALDRICH, Prod. No. 43708), xanthan XMM (SIGMA-ALDRICH, Prod. No G1253), xanthan XHM (SIGMA-ALDRICH, Prod. No. 42663), xanthan XDI (DANISCO, Prod. No. A43300), xanthan XMAS (DANISCO, Prod. No. A35300), and combinations thereof. Average molecular weights, branching, and structural configurations for these xanthan gums are listed in Table 2. Molecular weights were measured in accordance with the procedures described in Example 1.

TABLE 2

| Xanthan | Average Molecular Weight (Da) | Branching (per 1000 repeats) | Structural Configuration |
|---|---|---|---|
| XLM | 26,560,000 | 23 | Rod Shape |
| XMM | 8,700,000 | N/A | Random Coil |
| XHM | 4,500,000 | N/A | Random Coil |
| XDI | 6,000,000 | N/A | Rod Shape |
| XMAS | 33,000,000 | 81 | Rod Shape |

In some embodiments, the first xanthan gum can be selected from xanthan XMM, xanthan XMAS, and combinations thereof. In particular embodiments, the first xanthan gum can be xanthan XMM or xanthan XMAS.

When present in the composition, the second xanthan gum, which is different from the first xanthan gum, can be chosen from a xanthan gum having any of the properties specified for the first xanthan gum.

In some embodiments, the composition can comprise from about 50 ppm to about 4000 ppm, from about 50 ppm to about 1000 ppm, or from about 100 ppm to about 300 ppm of the pectin and from about 0.01 ppm to about 3000 ppm, from about 0.01 ppm to about 1000 ppm, or from about 0.01 ppm to about 100 ppm of the first xanthan gum. In particular embodiments, the composition comprises from about 100 ppm to about 300 ppm of the pectin and from about 0.01 ppm to about 100 ppm of the first xanthan gum.

In other embodiments, the composition can comprise from about 50 ppm to about 4000 ppm, from about 50 ppm to about 1000 ppm, or from about 100 ppm to about 300 ppm of the pectin, and from about 0.01 ppm to about 3000 ppm, from about 0.01 ppm to about 1000 ppm, or from about 0.01 ppm to about 100 ppm of the first xanthan gum, and from about 0.01 ppm to about 3000 ppm, from about 0.01 ppm to about 1000 ppm, or from about 0.01 ppm to about 100 ppm of the second xanthan gum. In particular embodiments, the composition comprises from about 100 ppm to about 300 ppm of the pectin, and from about 0.01 ppm to about 100 ppm of the first xanthan gum, and from about 0.01 ppm to about 100 ppm of the second xanthan gum.

In some embodiments, the second xanthan gum can be xanthan XLM, xanthan XMM, xanthan XHM, xanthan XDI, xanthan XMAS, or a combination of any of the foregoing. In other embodiments, the second xanthan gum can be xanthan XMM, xanthan XMAS, or a combination thereof. In particular embodiments, the second xanthan gum can be xanthan XMM. In other embodiments, the second xanthan gum can be xanthan XMAS.

In some embodiments, the composition comprises water. In certain embodiments, the water is "treated water."

In some embodiments, the composition can comprise a second pectin, different from the first pectin, such that the composition comprises both a first and a second pectin. Typically, the second pectin will have a molecular weight falling with the ranges previously specified herein for the first pectin. Likewise, the second pectin, if present, will be present in the composition in a concentration falling within the ranges previously specified for the first pectin. The second pectin can be selected from any known source of pectin, including, but not limited to, apple pectins, citrus pectins, grape pectins, carrot pectins, and combinations thereof and is different than the first pectin. In particular embodiments, the second pectin can be apple pectin.

In some embodiments, the first pectin and the second pectin can be present in the composition in a weight to weight ratio ranging from about 10:1 to about 1:10, from about 9:1 to about 1:9, from about 8:1 to about 1:8, from about 7:1 to about 1:7, from about 6:1 to about 1:6, from about 5:1 to about 1:5, from about 4:1 to about 1:4, from about 3:1 to about 1:3, or from about 2:1 to about 1:2, respectively. In particular embodiments, first pectin and the second pectin are present in the composition in a weight to weight ratio of about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, or about 1:10, respectively.

In one embodiment, the present disclosure provides a composition comprising apple pectin as the first pectin and xanthan XMM as the first xanthan gum. In some embodiments, the apple pectin has a degree of esterification ranging from about 80% to about 99%. In particular embodiments, the apple pectin is present in the composition at a concentration ranging from about 100 ppm to about 300 ppm and the xanthan XMM is present in the composition at a concentration ranging from about 0.01 ppm to about 100 ppm.

In one embodiment, the present disclosure provides a composition comprising apple pectin as the first pectin and xanthan XMAS as the first xanthan gum. In some embodiments, the apple pectin has a degree of esterification ranging from about 80% to about 99%. In particular embodiments, the apple pectin is present in the composition at a concentration ranging from about 100 ppm to about 300 ppm and the xanthan XMAS is present in the composition at a concentration ranging from about 0.01 ppm to about 100 ppm.

In one embodiment, the present disclosure provides a composition comprising apple pectin as the first pectin, xanthan XMM as the first xanthan gum, and xanthan XMAS as the second xanthan gum. In some embodiments, the apple pectin has a degree of esterification ranging from about 80% to about 99%. In particular embodiments, the apple pectin is present in the composition at a concentration ranging from about 100 ppm to about 300 ppm, the xanthan XMM is present in the composition at a concentration ranging from about 0.01 ppm to about 100 ppm, and the xanthan XMAS is present in the composition at a concentration ranging from about 0.01 ppm to about 100 ppm.

Viscosity

The composition described herein can have a viscosity ranging from about 0.01 to about 5.0 centipose ("cP"). In other embodiments, the composition can have a viscosity ranging from about 0.01 cP to about 5.0 cP, from about 0.1 cP to about 4.0 cP, from about 0.2 cP to about 3.5 cP, from about 0.3 cP to about 3.0 cP, from about 0.4 cP to about 2.8 cP, from about 0.5 cP to about 2.6 cP, from about 0.6 cP to about 2.4 cP, from about 0.7 cP to about 2.2 cP, from about 0.8 cP to about 2.0 cP, from about 0.9 cP to about 2.0 cP, from about 1.0 cP to about 2.0 cP, from about 1.0 cP to about 1.9 cP, from about 1.0 cP to about 1.8 cP, from about 1.0 cP to about 1.7 cP, from about 1.0 cP to about 1.6 cP, from about 1.0 cP to about 1.5 cP, or from about 1.1 cP to about 1.4 cP. In particular embodiments, the composition can have a viscosity of about 0.1 cP, about 0.2 cP, about 0.3 cP, about 0.4 cP, about 0.5 cP, about 0.6 cP, about 0.7 cP, about 0.8 cP, about 0.9 cP, about 1.0 cP, about 1.1 cP, about 1.2 cP, about 1.3 cP, about 1.4 cP, about 1.5 cP, about 1.6 cP, about 1.7 cP, about 1.8 cP, about 1.9 cP, about 2.0 cP, about 2.1 cP, about 2.2 cP, about 2.3 cP, about 2.4 cP, about 2.5 cP, about 2.6 cP, about 2.7 cP, about 2.8 cP, about 2.9 cP, or about 3.0 cP.

Viscosity of the composition can be measured using an ANTON PAAR MCR 702 rheometer with a cone and plate geometry at constant temperature (25° C.) over a range of shear rates (1-100 reciprocal seconds) in order to determine any shear thinning or shear thickening behavior, with measurements repeated in triplicate and then averaged. The reported viscosity is assumed to be that of a Newtonian fluid and is the average of all the values across the shear rate range after discarding outliers.

Coefficient of Friction

The composition described herein can have a coefficient of friction ranging from about 0.01 to about 5.0. In other embodiments, the composition can have a coefficient ranging of friction from about 0.01 to about 5.0, from about 0.1 to about 4.0, from about 0.2 to about 3.5, from about 0.3 to about 3.0, from about 0.4 to about 2.8, from about 0.5 to about 2.6, from about 0.6 to about 2.4, from about 0.7 to about 2.2, from about 0.8 to about 2.0, from about 0.9 to about 2.0, from about 0.9 to about 1.9, from about 0.9 to about 1.8, from about 0.9 to about 1.7, from about 0.9 to about 1.6, from about 0.9 to about 1.5, from about 0.9 to about 1.4, or from about 1.0 to about 1.3. In particular embodiments, the composition can have a coefficient of friction of about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, or about 3.0.

The coefficient of friction can be measured using a PCS INSTRUMENTS MTM2 mini traction machine fitted with a PDMS ball and PDMS disk. For example, a pot filler can be used to reduce the amount of sample needed to approximately 12 mL. The device measures the coefficient of friction over a range of sliding speeds (1-600 mm/s) at a set slide-roll ratio of 50%. The measurements can be taken in triplicate and then averaged across all three runs. A friction graph can then be generated by plotting average friction coefficients on the y-axis against log of sliding speed (mm/sec) on the x-axis.

Composition Comprising a Sweetener

The composition of the present disclosure can further comprise a non-nutritive sweetener, which can be a natural or artificial non-nutritive sweetener. Non-nutritive sweeteners include, but are not limited to, a steviol glycoside, Lo Han Guo sweetener, rubusoside, siamenoside, monatin, curculin, glycyrrhizic acid, neohesperidin, dihydrochalcone, glycyrrhizin, glycyphyllin, phloridzin, trilobatin, phyllodulcin, brazzein, hernandulcin, osladin, polypodoside A, baiyunoside, pterocaryoside A and B, mukurozioside, thaumatin, monellin, mabinlins I and II, phlomisoside I, periandrin I, abrusoside A, and cyclocarioside I, mogroside IV, mogroside V, or combinations thereof.

In some embodiments, the non-nutritive sweetener in the composition can be a steviol glycoside. In some embodiments, the steviol glycoside can be stevioside, rebaudioside A, rebaudioside B, rebaudioside C, rebaudioside D, rebaudioside E, rebaudioside F, rebaudioside G rebaudioside H rebaudioside I, rebaudioside J, rebaudioside K, rebaudioside L, rebaudioside M, rebaudioside N, rebaudioside O, rebaudioside P, rebaudioside Q, steviolbioside, dulcoside A, or a mixture of any of the foregoing. In some embodiments, the steviol glycoside is rebaudioside A, rebaudioside D, stevioside, rebaudioside M, or any combinations thereof.

In particular embodiments, the steviol glycoside in the composition is rebaudioside A. In other embodiments, the steviol glycoside in the composition is rebaudioside D. In other embodiments, the steviol glycoside in the composition is rebaudioside M. In other embodiments, the steviol glycoside in the composition is rebaudioside F. In other embodiments, the steviol glycoside in the composition is mixture of rebaudiosides A and D. In still further embodiments, the steviol glycoside in the composition is a mixture of rebaudiosides A, D, and M. In still further embodiments, the steviol glycoside in the composition is a mixture of stevioside, rebaudioside A, and rebaudioside D. In yet another embodiment, the steviol glycoside is a mixture of rebaudiosides D, M, and stevioside.

The concentration of steviol glycoside in the composition can range from about 20 ppm to about 10,000 ppm. For example, if the composition is a beverage, and as discussed below, steviol glycoside concentration can range from about 20 ppm to about 600 ppm total steviol glycoside content.

In other embodiments, such as when the composition is a beverage concentrate, and again, as discussed further elsewhere herein, steviol glycoside concentration can range from about 1 ppm to about 4800 ppm, from about 1 ppm to about 4500 ppm, from about 1 ppm to about 4200 ppm, from about 1 ppm to about 3900 ppm, from about 1 ppm to about 3600 ppm, from about 1 ppm to about 3300 ppm, from about 1 ppm to about 3000 ppm, from about 1 ppm to about 2700 ppm, from about 1 ppm to about 2400 ppm, from about 1 ppm to about 2100 ppm, from about 1 ppm to about 1800 ppm, from about 1 ppm to about 1500 ppm, from about 1 ppm to about 1200 ppm, from about 1 ppm to about 900 ppm, from about 1 ppm to about 600 ppm, or from about 1 ppm to about 300 ppm. In other embodiments, the steviol glycoside concentration can range from about 20 ppm to about 1000 ppm, from about 40 ppm to about 900 ppm, from about 60 ppm to about 800 ppm, from about 80 ppm to about 700 ppm, or from about 100 ppm to about 600 ppm. In particular embodiments, steviol glycoside concentration can be about 60 ppm, about 300 ppm, about 600 ppm, about 900 ppm, about 1200 ppm, about 1500 ppm, about 1800 ppm, about 2100 ppm, about 2400 ppm, about 2700 ppm, about 3000 ppm, about 3300 ppm, about 3600 ppm, about 3900 ppm, about 4200 ppm, about 4500 ppm, or about 4800 ppm.

The foregoing notwithstanding, it is within the skill of the ordinarily skilled artisan to select an appropriate steviol glycoside concentration for the composition depending on the composition's intended use.

Although the composition described herein typically does not include a nutritive sweetener, in certain embodiments, the composition can further comprise a nutritive sweetener. In some embodiments, the nutritive sweetener can be a natural nutritive sweetener. Exemplary natural nutritive sweeteners that can be included in the composition include any of those known in the art, for example, crystalline or liquid sucrose, fructose, glucose, dextrose, maltose, trehalose, fructo-oligosaccharides, glucose-fructose syrup from natural sources such as apple, chicory, and honey; high fructose corn syrup, invert sugar, maple syrup, maple sugar, honey, brown sugar molasses, cane molasses, such as first molasses, second molasses, blackstrap molasses, and sugar beet molasses; sorghum syrup, and mixtures thereof.

Other nutritive sweeteners suitable for use in the composition disclosed herein include, but are not limited to, sugar alcohols such as erythritol, sorbitol, mannitol, xylitol, lactitol, isomalt, malitol, tagatose, trehalose, galactose, rhamnose, cyclodextrin, ribulose, threose, arabinose, xylose, lyxose, allose, altrose, mannose, idose, lactose, maltose, isotrehalose, neotrehalose, palatinose or isomaltulose, erythrose, deoxyribose, gulose, talose, erythrulose, xylulose, psicose, turanose, cellobiose, glucosamine, mannosamine, fucose, fuculose, glucuronic acid, gluconic acid, gluconolactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, and mixtures thereof.

In some embodiments, the nutritive sweetener can be sucrose, high-fructose corn syrup, or a combination thereof.

The composition can also include one or more rare sugars, such as D-allose, D-psicose (also known as D-allulose), L-ribose, D-tagatose, L-glucose, L-fucose, L-arabinose, D-turanose, D-leucrose, and mixtures thereof. In particular embodiments, the composition can comprise D-psicose.

The composition of the present disclosure can also contain other additional ingredients, such as a solubilizing or a bulking agent. Exemplary solubilizing or bulking agent includes maltodextrin, dextrose-maltodextrin blends, hydroxypropylmethyl cellulose, carboxymethyl cellulose, polyvinylpyrrolidone, and combinations thereof.

The composition of the present disclosure can also contain an artificial sweetener, a sweetness enhancer, and/or a binding or an anti-caking agent.

Exemplary artificial sweeteners include, but are not limited to, saccharin, cyclamate, aspartame, neotame, advantame, acesulfame potassium, sucralose, and mixtures thereof.

Suitable sweetness enhancers include any of those known in the art. Exemplary sweetness enhancers include, but are not limited to sugar alcohol sweetness enhancer (such as erythritol, sorbitol, mannitol, xylitol, lactitol, isomalt, malitol, and mixtures thereof), or rare sugar sweetness enhancer (D-psicose, D-allose, L ribose, D-tagatose, L glucose, L-fucose, L-arabinose, D-turanose, D-leucrose, and mixtures thereof).

In some embodiments, the sweetness enhancer is a salt based (such as NaCl or potassium sorbate) or a benzoic acid based sweetness enhancer (such as potassium benzoate).

Beverages

In certain embodiments, the composition described herein can be a beverage. In some embodiments, the beverage is a ready-to-drink beverage. In some embodiments, the beverage can have fewer than about 200 calories per 8 oz serving, fewer than about 150 calories per 8 oz serving, fewer than about 100 calories per 8 oz serving, fewer than about 70 calories per 8 oz serving, fewer than about 50 calories per 8 oz serving, fewer than about 10 calories per 8 oz serving, or fewer than about 5 calories per 8 oz serving.

In some embodiments, the beverage can comprise a pectin in an amount ranging from about 1 ppm to about 1000 ppm, from about 1 ppm to about 950 ppm, from about 1 ppm to about 900 ppm, from about 1 ppm to about 850 ppm, from about 1 ppm to about 800 ppm, from about 1 ppm to about 750 ppm, from about 1 ppm to about 700 ppm, from about 1 ppm to about 650 ppm, from about 1 ppm to about 600 ppm, from about 1 ppm to about 550 ppm, from about 1 ppm to about 500 ppm, from about 1 ppm to about 450 ppm, from about 1 ppm to about 400 ppm, from about 1 ppm to about 350 ppm, or from about 1 ppm to about 300 ppm. In other embodiments, the beverage can comprise a pectin in an amount ranging from about 1 ppm to about 1000 ppm, from about 10 ppm to about 900 ppm, from about 20 ppm to about 800 ppm, from about 30 ppm to about 700 ppm, from about 40 ppm to about 600 ppm, from about 50 ppm to about 500 ppm, from about 60 ppm to about 400 ppm, from about 70 ppm to about 350 ppm, from about 80 ppm to about 300 ppm, from about 90 ppm to about 300 ppm, or from about 100 ppm to about 300 ppm. In particular embodiments, the beverage can comprise a pectin in an amount of about 50 ppm, about 60 ppm, about 70 ppm, about 80 ppm, about 90 ppm, about 100 ppm, about 110 ppm, about 120 ppm, about 130 ppm, about 140 ppm, about 150 ppm, about 200 ppm, about 250 ppm, about 300 ppm, about 350 ppm, about 400 ppm, about 450 ppm, about 500 ppm, about 600 ppm, about 700 ppm, about 800 ppm, about 900 ppm, or about 1000 ppm.

In some embodiments, the beverage can comprise a first and optional second xanthan gums, wherein each of the first and optional second xanthan gums can be present in the beverage in an amount ranging from about 1 ppm to about 1000 ppm, from about 1 ppm to about 900 ppm, from about 1 ppm to about 800 ppm, from about 1 ppm to about 700 ppm, from about 1 ppm to about 600 ppm, from about 1 ppm to about 500 ppm, from about 1 ppm to about 450 ppm, from about 1 ppm to about 400 ppm, from about 1 ppm to about 350 ppm, from about 1 ppm to about 300 ppm, from about 1 ppm to about 250 ppm, from about 1 ppm to about 200 ppm, from about 1 ppm to about 150 ppm, or from about 1 ppm to about 100 ppm. In particular embodiments, the beverage can comprise a first and optional second xanthan gum each in an amount of about 10 ppm, about 15 ppm, about 20 ppm, about 25 ppm, about 30 ppm, about 35 ppm, about 40 ppm, about 45 ppm, about 50 ppm, about 55 ppm, about 60 ppm, about 65 ppm, about 70 ppm, about 75 ppm, about 80 ppm, about 85 ppm, about 90 ppm, about 95 ppm, about 100 ppm, about 150 ppm, about 200 ppm, about 250 ppm, or about 300 ppm.

In certain embodiments, the beverage further comprises an acidulant and, optionally, a flavorant.

Suitable acidulants include, but are not limited to phosphoric acid, citric acid, malic acid, tartaric acid, lactic acid, formic acid, ascorbic acid, fumaric acid, gluconic acid, succinic acid, maleic acid, adipic acid, and mixtures thereof.

Suitable flavorants include, but are not limited to a cola flavorant, a tea flavorant, a caramel flavorant, a coffee flavorant, a citrus flavorant (including, but not limited to, a lemon flavorant, a lime flavorant, an orange flavorant, a grapefruit flavorant, a mandarin orange flavorant, a tangerine flavorant, a tangelo flavorant, or a combination of any of the foregoing), an herbal flavorant, a berry flavoring (such as a flavorant derived from one or more of Barbados cherry, bearberry, blackberry, blueberry, boysenberry, cherry, choke cherry, cloudberry, cranberry, current, date, dewberry, elderberry, grape, gooseberry, huckleberry, loganberry, olallieberry, mulberry, raisin, plains berry, prairie berry, raspberry, saskatoon berry, salmonberry, seabuckthorn berry, sloe berry, strawberry, thimbleberry, thornberry, wineberry, whortleberry, or a combination of any of the foregoing), a botanical flavorant (such as one or more flavors derived from a part of a plant other than the fruit, including flavors derived from essential oils and extracts of nuts, bark, roots and leaves along with synthetically prepared flavors made to simulate botanical flavors derived from natural sources), and mixtures thereof.

In certain embodiments, and as discussed above, the beverage can comprise a non-nutritive sweetener. In particular embodiments, the non-nutritive sweetener can be selected from the group consisting of a steviol glycoside, Lo Han Guo sweetener, rubusoside, siamenoside, monatin, curculin, glycyrrhizic acid, neohesperidin, dihydrochalcone, glycyrrhizin, glycyphyllin, phloridzin, trilobatin, phyllodulcin, brazzein, hernandulcin, osladin, polypodoside A, baiyunoside, pterocaryoside A and B, mukurozioside, thaumatin, monellin, mabinlins I and II, phlomisoside I, periandrin I, abrusoside A, and cyclocarioside I, mogroside IV, mogroside V, or combinations thereof.

In some embodiments, the non-nutritive sweetener in the beverage can be a steviol glycoside. In some embodiments, the steviol glycoside can be stevioside, rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside N, rebaudioside O, rebaudioside P, rebaudioside Q, steviolbioside, dulcoside A, or a mixture of any of the foregoing. In some embodiments, the steviol glycoside is rebaudioside A, rebaudioside D, stevioside, rebaudioside M, or any combinations thereof.

In particular embodiments, the steviol glycoside in the beverage is rebaudioside A. In other embodiments, the steviol glycoside in the beverage is rebaudioside D. In other embodiments, the steviol glycoside in the beverage is rebaudioside M. In other embodiments, the steviol glycoside in the beverage is rebaudioside F. In other embodiments, the steviol glycoside in the beverage is mixture of rebaudiosides A and D. In still further embodiments, the steviol glycoside in the beverage is a mixture of rebaudiosides A, D, and M. In still further embodiments, the steviol glycoside in the beverage is a mixture of stevioside, rebaudioside A, and rebaudioside D. In yet another embodiment, the steviol glycoside is a mixture of rebaudiosides D, M, and stevioside.

In certain embodiments, the non-nutritive sweetener can be present in the beverage in an amount ranging from about 1 ppm to about 800 ppm, from about 1 ppm to about 750 ppm, from about 1 ppm to about 700 ppm, from about 1 ppm to about 650 ppm, from about 1 ppm to about 600 ppm, from about 1 ppm to about 550 ppm, from about 1 ppm to about 500 ppm, from about 1 ppm to about 450 ppm, from about 1 ppm to about 400 ppm, from about 1 ppm to about 350 ppm, from about 1 ppm to about 300 ppm, from about 1 ppm to about 250 ppm, from about 1 ppm to about 200 ppm, from about 1 ppm to about 150 ppm, from about 1 ppm to about 100 ppm, or from about 1 ppm to about 50 ppm, depending upon the particular non-nutritive sweetener(s) being used and the desired level of sweetness in the beverage. In particular embodiments, the non-nutritive sweetener can be present in the beverage in an amount of about 1 ppm, about 10 ppm, about 50 ppm, about 100 ppm, about 150 ppm, about 200 ppm, about 250 ppm, about 300 ppm, about 350 ppm, about 400 ppm, about 450 ppm, about 500 ppm, about 550 ppm, about 600 ppm, about 650 ppm, about 700 ppm, about 750 ppm, or about 800 ppm.

In certain embodiments, the beverage can also include one or more salts. The salt concentration can range from about 100 ppm to about 1000 ppm, or from about 200 ppm to about 800 ppm. In particular embodiments, the salt can be sodium chloride. In certain embodiments, the beverage composition can be completely or substantially salt free.

In some embodiments, the beverage can further comprise caffeine. In other embodiments, the beverage can be substantially caffeine free, or is caffeine free.

In certain embodiments, the beverage can further comprise other ingredients such as antioxidants, food grade acids, and food grade bases. Other beverage components such as colors, preservatives, carbon dioxide, buffering salts, and the like, can also be present.

Suitable food grade acids are water soluble organic acids and their salts and include, for example, phosphoric acid, sorbic acid, ascorbic acid, benzoic acid, citric acid, tartaric acid, propionic acid, butyric acid, acetic acid, succinic acid, glutaric acid, maleic acid, malic acid, valeric acid, caproic acid, malonic acid, aconitic acid, potassium sorbate, sodium benzoate, sodium citrate, amino acids, and combinations of any of them. Such acids are suitable for adjusting the pH of the food or beverage.

Suitable food grade bases are sodium hydroxide, potassium hydroxide, and calcium hydroxide. Such bases also are suitable for adjusting the pH of a food or beverage.

In some embodiments, the beverage can be a carbonated beverage, a non-carbonated beverage, a fountain beverage, a frozen beverage, a frozen carbonated beverage, a fruit juice, a fruit juice-flavored drink, a fruit-flavored drink, a cola beverage, a sports drink, an energy drink, a fortified/enhanced water drink, a flavored water, a soy drink, a vegetable drink, a grain-based drink, a malt beverage, a fermented drink, a yogurt drink, kefir, a coffee beverage, a tea beverage, a dairy beverage, a smoothie drink, a caffeinated energy drink, or an alcoholic beverage.

In some embodiments, the beverage can be a cola beverage. In other embodiments, the cola beverage can comprise cola flavoring and a non-nutritive sweetener selected from the group consisting of a steviol glycoside, Lo Han Guo sweetener, rubusoside, siamenoside, monatin, curculin, glycyrrhizic acid, neohesperidin, dihydrochalcone, glycyrrhizin, glycyphyllin, phloridzin, trilobatin, phyllodulcin, brazzein, hernandulcin, osladin, polypodoside A, baiyunoside, pterocaryoside A and B, mukurozioside, thaumatin, monellin, mabinlins I and II, phlomisoside I, periandrin I, abrusoside A, and cyclocarioside I, mogroside IV, mogroside V, or combinations thereof.

In some embodiments, the non-nutritive sweetener can be a steviol glycoside. In particular embodiments, the steviol glycoside can be selected from the group consisting of stevioside, rebaudioside A, rebaudioside B, rebaudioside C, rebaudioside D, rebaudioside E, rebaudioside F, rebaudioside G rebaudioside H rebaudioside I, rebaudioside J, rebaudioside K, rebaudioside L, rebaudioside M, rebaudioside N, rebaudioside O, rebaudioside P, rebaudioside Q, steviolbioside, dulcoside A, and combinations thereof.

In particular embodiments, the beverage can be a carbonated cola beverage, containing, amongst other things, water, sweetener, kola nut extract and/or other flavorings, caramel coloring, phosphoric acid, optionally caffeine, and optionally other ingredients. Additional and alternative suitable ingredients will be recognized by those skilled in the art given the benefit of this disclosure.

Carbonation in the form of carbon dioxide can be added for effervescence. Any of the techniques and carbonating equipment known in the art for carbonating beverages can be employed. Carbon dioxide can enhance beverage taste and appearance and can aid in safeguarding the beverage purity by inhibiting and/or destroying objectionable bacteria. In certain embodiments, for example, the beverage can have a $CO_2$ level up to about 4.0 volumes carbon dioxide. Other embodiments can have, for example, from about 0.5 to about 5.0 volumes of carbon dioxide. As used herein, one volume of carbon dioxide refers to the amount of carbon dioxide absorbed by a given quantity of a given liquid, such as water, at 60° F. (16° C.) and one atmospheric pressure. A volume of gas occupies the same space as does the liquid by which it is dissolved. The carbon dioxide content can be selected by those skilled in the art based on the desired level of effervescence and the impact of the carbon dioxide on the taste or mouthfeel of the beverage.

Beverages can have any of numerous different specific formulations or constituents. The formulation of a beverage can vary, depending upon such factors as the product's intended market segment, its desired nutritional characteristics, flavor profile, and the like. Thus further ingredients can be added to the formulation of a particular beverage. Further ingredients include, but are not limited to, one or more additional sweeteners in addition to any sweetener already present, electrolytes, vitamins, flavor enhancers, carbonation, preservatives, or any combination thereof. These ingredients can be added to any of the beverage compositions to vary the taste, mouthfeel, and/or nutritional values of the beverage composition.

Preservatives can be used in certain food or beverages. As used here, the term "preservatives" include all suitable preservatives approved for use in beverage compositions, including, without limitation, such known chemical preservatives as benzoates, such as sodium, calcium, and potassium benzoate, sorbates, such as sodium, calcium, and potassium sorbate, citrates, such as sodium citrate and potassium citrate, polyphosphates, such as sodium hexametaphosphate (SHMP), and mixtures thereof, and antioxidants such as ascorbic acid, EDTA, BHA, BHT, TBHQ, dehydroacetic acid, dimethyldicarbonate, ethoxyquin, heptylparaben, and combinations thereof. Preservatives can be used in amounts not exceeding mandated maximum levels under applicable laws and regulations.

Beverage Concentrates

In certain embodiments, the composition described herein can be a beverage concentrate. In some embodiments, the beverage concentrate can comprise a pectin in an amount ranging from about 1 ppm to about 7000 ppm, from about 1 ppm to about 6500 ppm, from about 1 ppm to about 6000 ppm, from about 1 ppm to about 5500 ppm, from about 1 ppm to about 5000 ppm, from about 1 ppm to about 4500 ppm, from about 1 ppm to about 4000 ppm, from about 1 ppm to about 3500 ppm, from about 1 ppm to about 3000 ppm, from about 1 ppm to about 2500 ppm, from about 1 ppm to about 2000 ppm, from about 1 ppm to about 1500 ppm, from about 1 ppm to about 1000 ppm, from about 1 ppm to about 900 ppm, from about 1 ppm to about 800 ppm, from about 1 ppm to about 700 ppm, from about 1 ppm to about 600 ppm, or from about 1 ppm to about 500 ppm. In other embodiments, the beverage concentrate can comprise a pectin in an amount ranging from about 1 ppm to about 7000 ppm, from about 100 ppm to about 6000 ppm, from about 200 ppm to about 5000 ppm, from about 300 ppm to about 4000 ppm, from about 400 ppm to about 3000 ppm, from about 300 ppm to about 2000 ppm, from about 300 ppm to about 1900 ppm, or from about 300 ppm to about 1800 ppm. In particular embodiments, the beverage concentrate can comprise a pectin in an amount of about 100 ppm, about 200 ppm, about 300 ppm, about 400 ppm, about 500 ppm, about 600 ppm, about 700 ppm, about 800 ppm, about 900 ppm, about 1000 ppm, about 1200 ppm, about 1400 ppm, about 1600 ppm, about 1800 ppm, or about 2000 ppm.

In some embodiments, the beverage concentrate can comprise a first and optional second xanthan gums, wherein each of the first and optional second xanthan gums can be present in the beverage concentrate in an amount ranging from about 1 ppm to about 2500 ppm, from about 1 ppm to about 2000 ppm, from about 1 ppm to about 1500 ppm, from about 1 ppm to about 1000 ppm, from about 1 ppm to about 950 ppm, from about 1 ppm to about 900 ppm, from about 1 ppm to about 850 ppm, from about 1 ppm to about 800 ppm, from about 1 ppm to about 750 ppm, from about 1 ppm to about 700 ppm, from about 1 ppm to about 650 ppm, from about 1 ppm to about 600 ppm, from about 1 ppm to about 550 ppm, from about 1 ppm to about 500 ppm, from about 1 ppm to about 450 ppm, from about 1 ppm to about 400 ppm, from about 1 ppm to about 350 ppm, from about 1 ppm to about 300 ppm, from about 1 ppm to about 250 ppm, from about 1 ppm to about 200 ppm, from about 1 ppm to about 150 ppm, or from about 1 ppm to about 100 ppm. In particular embodiments, the beverage concentrate can comprise a first and optional second xanthan gum each in an amount of about 50 ppm, about 100 ppm, about 150 ppm, about 200 ppm, about 250 ppm, about 300 ppm, about 350 ppm, about 400 ppm, about 450 ppm, about 500 ppm, about 550 ppm, or about 600 ppm.

Additional and alternative suitable ingredients for a beverage concentrate can be readily recognized by those skilled in the art. For example, one or more salts can be included in the beverage concentrate in an amount ranging from about 600 ppm to about 6000 ppm, or from about 1200 ppm to about 2400 ppm. In certain embodiments, beverage concentrates can be completely or substantially salt free.

In some embodiments, the beverages described herein, and in particular, so called "ready-to-drink beverages" can be prepared from the beverage concentrate by adding a certain volume of water to the concentrate. For example, a ready-to-drink beverage can be prepared from the beverage concentrate by combining 1 part concentrate with about 3 to about 7 parts water. In one embodiment, the ready-to-drink beverage can be prepared by combining 1 part concentrate with 5 parts water.

In certain embodiments, the present disclosure also includes a kit comprising the beverage concentrate. In addition to the concentrate, the kit can comprise any of the additional elements required for preparing a concentrate, or beverage (from the concentrate), such as flavorings, acids, antioxidants, etc., exclusive of, or optionally including, any additional water that might be required to dilute the concentrate. The kit can further include instructions for preparing a beverage. In certain embodiments the kit can be provided to a beverage bottler or to a beverage retailer for preparing beverages on a commercial scale. When provided to a retailer, the kit can contain instructions for preparing beverages using a post-mix delivery system, such as calibration instructions, etc.

The present disclosure further include kits comprising one or more pods, cartridges, or other containers adapted to store a sufficient quantity of the beverage concentrate to prepare a single- or multiple-serve beverage from the concentrate. In some embodiments, the kit can further include a beverage-dispensing apparatus adapted to receive the one or more pods or cartridges, wherein, upon activation by a user, the beverage dispensing apparatus combines the contents of one pod or cartridge with an appropriate volume of optionally carbonated water, or other diluent, to provide a single- or multiple-serve beverage. In still further embodiments, the kit can include instructions for operating the beverage-dispensing apparatus, cleaning the apparatus, and refilling and/or recycling spent pods or cartridges. In certain embodiments, the beverage-dispensing apparatus can be suitable for use in a commercial setting, such as a retail environment. In other embodiments, the beverage dispensing apparatus can be suitable for home or "on the go" use. Pods and cartridges adapted to store a beverage concentrate for preparing single- or multiple-serve beverages as well as beverage dispensing apparatuses adapted to receive pods and cartridges for preparing a single- or multiple-serve beverage, both for home and commercial use, are known to those of ordinary skill in the art.

Method for Improving Mouthfeel

In another embodiment, the present disclosure provides a method for improving mouthfeel of a beverage. In some embodiments, the method for improving mouthfeel of a beverage comprises adding to a beverage or beverage concentrate a pectin having an average molecular weight ranging from about 10,000 Da to about 1,000,000 Da, from about 20,000 Da to about 800,000 Da, from about 30,000 Da to about 600,000 Da, from about 40,000 Da to about 500,000 Da, or from about 50,000 Da to about 400,000 Da, and a first and an optional second xanthan gum each having an average molecular weight ranging from about 1,000,000 Da to about 50,000,000 Da, from about 2,000,000 Da to about 45,000,000 Da, from about 3,000,000 Da to about 40,000,000 Da, or from about 3,000,000 Da to about 35,000,000 Da. In particular embodiments, the method for improving mouthfeel of a beverage comprises adding to a beverage or beverage concentrate a pectin having an average molecular weight ranging from about 50,000 Da to about 400,000 Da, and a first and an optional second xanthan gum each having an average molecular weight ranging from about 3,000,000 Da to about 35,000,000 Da.

Method of Making Compositions

The compositions of the present disclosure can be prepared using suitable methods known to those of ordinary skill in the art. For example, in certain embodiments, the compositions can be prepared by adding a sufficient amount of the pectin, a sufficient amount of the first xanthan gum, and optionally a sufficient amount of the second xanthan gum in water, or other appropriate diluent. The adding of ingredients (pectin, first xanthan gum, and optionally, the second xanthan gum) can be effected by any appropriate means that are known in the art. For example, the compositions can be prepared by dissolving any two ingredients in water, or other appropriate diluent, and then adding the third ingredient to the mixture. Alternatively, the compositions can be prepared by dissolving one of the ingredients in water, or other appropriate diluent, and then adding the other two ingredients to the mixture.

In various embodiments, the pectin, the first xanthan gum, and optionally the second xanthan gum can be added to the water, or other appropriate diluent, at the same time or individually in any order.

In some embodiments, the pectin, the first xanthan gum, and optionally the second xanthan gum can be added to water, or other appropriate diluent, at any temperature required to result in dissolution of the various ingredients. For example, the pectin, the first xanthan gum, and optionally, the second xanthan gum, can be added to water, or other appropriate diluent, at a temperature ranging from about 15° C. to about 100° C., from about 18° C. to about 80° C., from about 18° C. to about 60° C., from about 18° C. to about 40° C., or from about 18° C. to about 30° C. In particular embodiments, the pectin, the first xanthan gum, and optionally, the second xanthan gum, can be added to water, or other appropriate diluent, at a temperature of about 18° C., about 19° C., about 20° C., about 21° C., about 22° C., about 23° C., about 24° C., about 25° C., about 26° C., about 27° C., about 28° C., about 29° C., or about 30° C.

During preparation, the compositions can be mixed at high or low shear and at any of the identified temperatures, as necessary, to induce or aid dissolution. It is within the skill of the ordinary skilled artisan to identify the appropriate shear level and/or temperature for a given mixture to obtain the results described herein.

Food Products

The composition of present disclosure can also be used in food products. Suitable food products include, but are not limited to, oatmeal, cereal, baked goods, cookies, crackers, cakes, brownies, breads, snack foods (such as snack bars), potato or tortilla chips, popcorn, rice cakes, and other grain-based food products.

In some embodiments, the composition of the present disclosure can also be suitable for use in cooking, baking (such as for use in cookies, cakes, pies, brownies, breads, granola bars, etc.), for preparing sweetened toppings, such as icings, and for use in jellies, jams, preserves, oat-based products, and the like. It is similarly suitable for use in frozen dairy products, such as ice cream, as well as in whipped toppings.

EMBODIMENTS

In addition to the various embodiments described above, the present disclosure includes the following specific embodiments numbered E1 through E49. This list of embodiments is presented as an exemplary list and the application is not limited to these embodiments.

E1. A composition, comprising a pectin having an average molecular weight ranging from about 50,000 Da to about 400,000 Da; and a first xanthan gum having an average molecular weight ranging from about 3,000,000 Da to about 35,000,000 Da.

E2. The composition of E1, wherein the pectin is selected from the group consisting of apple pectins, citrus pectins, grape pectins, and carrot pectins.

E3. The composition of E2, wherein the pectin is apple pectin.

E4. The composition of E1, wherein the first xanthan gum is selected from the group consisting of xanthan XLM, xanthan XMM, xanthan XHM, xanthan XDI, and xanthan XMAS.

E5. The composition of E4, wherein the first xanthan gum is selected from the group consisting of xanthan XMM and xanthan XMAS.

E6. The composition of E1, wherein the pectin has a degree of esterification ranging from about 50% to about 99%.

E7. The composition of E6, wherein the pectin has a degree of esterification ranging from about 80% to about 99%.

E8. The composition of E7, wherein the pectin has a degree of esterification of at least about 85%.

E9. The composition of E1, wherein the pectin is present in the composition at a concentration ranging from about 50 ppm to about 4000 ppm.

E10. The composition of E9, wherein the pectin is present in the composition at a concentration ranging from about 50 ppm to about 1000 ppm.

E11. The composition of E10, wherein the pectin is present in the composition at a concentration ranging from about 100 ppm to about 300 ppm.

E12. The composition of E1, wherein the first xanthan gum is present in the composition at a concentration of less than about 3000 ppm.

E13. The composition of E1, wherein the first xanthan gum is present in the composition at a concentration of less than about 1000 ppm.

E14. The composition of E1, wherein the first xanthan gum is present in the composition at a concentration of less than about 100 ppm.

E15. The composition of E1, wherein the first xanthan gum has an average molecular weight ranging from about 6,000,000 Da to about 10,000,000 Da.

E16. The composition of E1, wherein the first xanthan gum has an average molecular weight ranging from about 8,000,000 Da to about 9,000,000 Da.

E17. The composition of E1, wherein the first xanthan gum has an average molecular weight ranging from about 25,000,000 Da to about 40,000,000 Da.

E18. The composition of E1, wherein the first xanthan gum has an average molecular weight ranging from about 30,000,000 Da to about 35,000,000 Da.

E19. The composition of E15, further comprising a second xanthan gum, wherein the second xanthan gum has an average molecular weight ranging from about 25,000,000 Da to about 40,000,000 Da.

E20. The composition of E16, further comprising a second xanthan gum, wherein the second xanthan gum has an average molecular weight ranging from about 30,000,000 Da to about 35,000,000 Da.

E21. The composition of E1, wherein the pectin has an average molecular weight ranging from about 50,000 Da to about 300,000 Da.

E22. The composition of E21, wherein the pectin has an average molecular weight ranging from about 100,000 Da to about 200,000 Da.

E23. The composition of E20, wherein the pectin has an average molecular weight ranging from about 100,000 Da to about 200,000 Da.

E24. The composition of E1, comprising from about 100 ppm to about 300 ppm of the pectin; and less than about 100 ppm of the first xanthan gum.

E25. The composition of E19, comprising from about 100 ppm to about 300 ppm of the pectin; less than about 100 ppm of the first xanthan gum; and less than about 100 ppm of the second xanthan gum.

E26. The composition of E24, wherein the pectin is apple pectin.

E27. The composition of E24, wherein the first xanthan gum is selected from the group consisting of xanthan XMM and xanthan XMAS.

E28. The composition of E25, wherein the first xanthan gum and the second xanthan gum are selected from the group consisting of xanthan XMM and xanthan XMAS.

E29. The composition of E1, wherein the composition has a viscosity ranging from about 1.0 to about 1.5.

E30. The composition of E29, wherein the composition has a viscosity ranging from about 1.1 to about 1.4.

E31. The composition of E1, wherein the composition has a coefficient of friction ranging from about 0.9 to about 1.4.

E32. The composition of E31, wherein the composition has a coefficient of friction ranging from about 1.0 to about 1.3.

E33. The composition of E1, further comprising water.

E34. The composition of E1, further comprising a second pectin having an average molecular weight ranging from about 50,000 Da to about 400,000 Da.

E35. The composition of E34, wherein the second pectin is selected from the group consisting of apple pectins, citrus pectins, grape pectins, and carrot pectins.

E36. The composition of E1, wherein the composition is a beverage.

E37. The beverage of E36, further comprising a non-nutritive sweetener.

E38. The beverage of E37, wherein the non-nutritive sweetener is selected from the group consisting of a steviol glycoside, Lo Han Guo sweetener, rubusoside, siamenoside, monatin, curculin, glycyrrhizic acid, neohesperidin, dihydrochalcone, glycyrrhizin, glycyphyllin, phloridzin, trilobatin, phyllodulcin, brazzein, hernandulcin, osladin, polypodoside A, baiyunoside, pterocaryoside A and B, mukurozioside, thaumatin, monellin, mabinlins I and II, phlomisoside I, periandrin I, abrusoside A, and cyclocarioside I, mogroside IV, mogroside V, or combinations thereof.

E39. The beverage of E38, wherein the non-nutritive sweetener is a steviol glycoside.

E40. The beverage of E39, wherein the steviol glycoside is selected from the group consisting of stevioside, rebaudioside A, rebaudioside B, rebaudioside C, rebaudioside D, rebaudioside E, rebaudioside F, rebaudioside G rebaudioside H rebaudioside I, rebaudioside J, rebaudioside K, rebaudioside L, rebaudioside M, rebaudioside N, rebaudioside O, rebaudioside P, rebaudioside Q, steviolbioside, dulcoside A, and combinations thereof.

E41. The beverage of E36, wherein the beverage is a carbonated beverage, a non-carbonated beverage, a fountain beverage, a frozen carbonated beverage, a fruit juice, a fruit juice-flavored drink, a fruit-flavored drink, a cola beverage, a sports drink, an energy drink, a fortified/enhanced water drink, a flavored water, a soy drink, a vegetable drink, a grain-based drink, a malt beverage, a fermented drink, a yogurt drink, kefir, a coffee beverage, a tea beverage, or a dairy beverage.

E42. The beverage of E41, wherein the beverage is a cola beverage.

E43. The beverage of E42, further comprising cola flavoring and a non-nutritive sweetener.

E44. The beverage of E43, wherein the non-nutritive sweetener is selected from the group consisting of a steviol glycoside, Lo Han Guo sweetener, rubusoside, siamenoside, monatin, curculin, glycyrrhizic acid, neohesperidin, dihydrochalcone, glycyrrhizin, glycyphyllin, phloridzin, trilobatin, phyllodulcin, brazzein, hernandulcin, osladin, polypodoside A, baiyunoside, pterocaryoside A and B, mukurozioside, thaumatin, monellin, mabinlins I and II, phlomisoside I, periandrin I, abrusoside A, and cyclocarioside I, mogroside IV, mogroside V, or combinations thereof.

E45. A method for improving mouthfeel of a beverage, comprising adding to the beverage a pectin having an average molecular weight ranging from about 50,000 Da to about 400,000 Da; and a first and an optional second xanthan gum each having an average molecular weight ranging from about 3,000,000 Da to about 35,000,000 Da.

EXAMPLES

Example 1—Viscosity and Coefficients of Friction for Individual Pectins and Xanthan Gums The molecular weights of the four commercially available pectins and five commercially available xanthan gums listed in Table 3 were determined using gel permeation chromatography (GPC). In order to analyze the samples on GPC, 0.1 grams (g) of each pectin and each xanthan gum was separately added to 70 ml of 0.1 M sodium nitrate. Each mixture was heated to boiling and stirred until fully dissolved. Each mixture was then cooled and 0.1 M sodium nitrate was added until each sample had a total volume of 100 ml. Each sample was filtered through a 0.2 µm filter (GHP ACRODISK 25 mm syringe filters from Pall Life Sciences) and an appropriate volume of the sample was injected into the GPC to determine the molecular weight of the pectin or xanthan gum. The molecular weights are listed in Table 3.

TABLE 3

| No. | Material | Average Molecular Weight (Da) | Branching (per 1000 repeats) | Structural Configuration |
|---|---|---|---|---|
| 1 | Apple Pectin (APec) | 146,572 | N/A | Random Coil |
| 2 | Citrus Peel Pectin (CPPec) | 165,314 | N/A | Random Coil |
| 3 | Citrus Pectin DE 55-70% (PEC60) | 253,623 | N/A | Random Coil |
| 4 | Citrus Pectin DE 90% (PEC90) | 67,198 | N/A | Random Coil |
| 5 | Xanthan XLM | 26,560,000 | 23 | Rod Shape |
| 6 | Xanthan XMM | 8,700,000 | N/A | Random Coil |
| 7 | Xanthan XHM | 4,500,000 | N/A | Random Coil |
| 8 | Xanthan XDI | 6,000,000 | N/A | Rod Shape |
| 9 | Xanthan XMAS | 33,000,000 | 81 | Rod Shape |

*The abbreviation "DE" in Table 3 indicates the degree of esterification of the listed pectin.

A diet cola base sample was prepared by adding 0.10175 g acesulfame potassium, 0.6985 g sucralose, 0.04915 g anhydrous citric acid, and 0.46 g 80% phosphoric acid to 750 ml of treated water and stirring the mixture. The pH of the diet cola base sample was adjusted to 2.9 using 0.1 M citric acid and water was added to make the final volume 1000 ml.

Nine samples were then prepared by adding a sufficient quantity of the pectin or xanthan gum identified in Table 3 to diet cola base prepared as above to achieve a pectin or xanthan gum concentration of 1000 ppm.

The viscosity for each sample and the diet cola base sample was determined using an ANTON PAAR MCR 702 rheometer with a cone and plate geometry. Measurements were taken at constant temperature (25° C.) over a range of shear rates (1-100 reciprocal seconds) in order to determine any shear thinning or shear thickening behavior. The measurements were repeated in triplicate and then averaged. The reported viscosity was assumed to be that of a Newtonian fluid and was the average of all the values across the shear rate range after discarding outliers. The viscosity for each sample and the diet cola base sample is shown in FIG. 3.

The coefficient of friction for each sample and the diet cola base sample was then determined using a PCS INSTRUMENTS MTM2 mini traction machine fitted with a PDMS ball and PDMS disk. A pot filler was used to reduce the amount of sample needed to approximately 12 mL. The device measured the coefficient of friction over a range of sliding speeds (1-600 mm/s) at a set slide-roll ratio of 50%. The measurements were taken in triplicate and the values were averaged across all three runs to generate a friction graph. The data was then plotted with friction coefficients (dimensionless) on the y-axis against log of sliding speed (mm/sec) on the x-axis. The coefficient of friction for each sample and the diet cola base sample is shown in FIG. 4.

Figure 3:
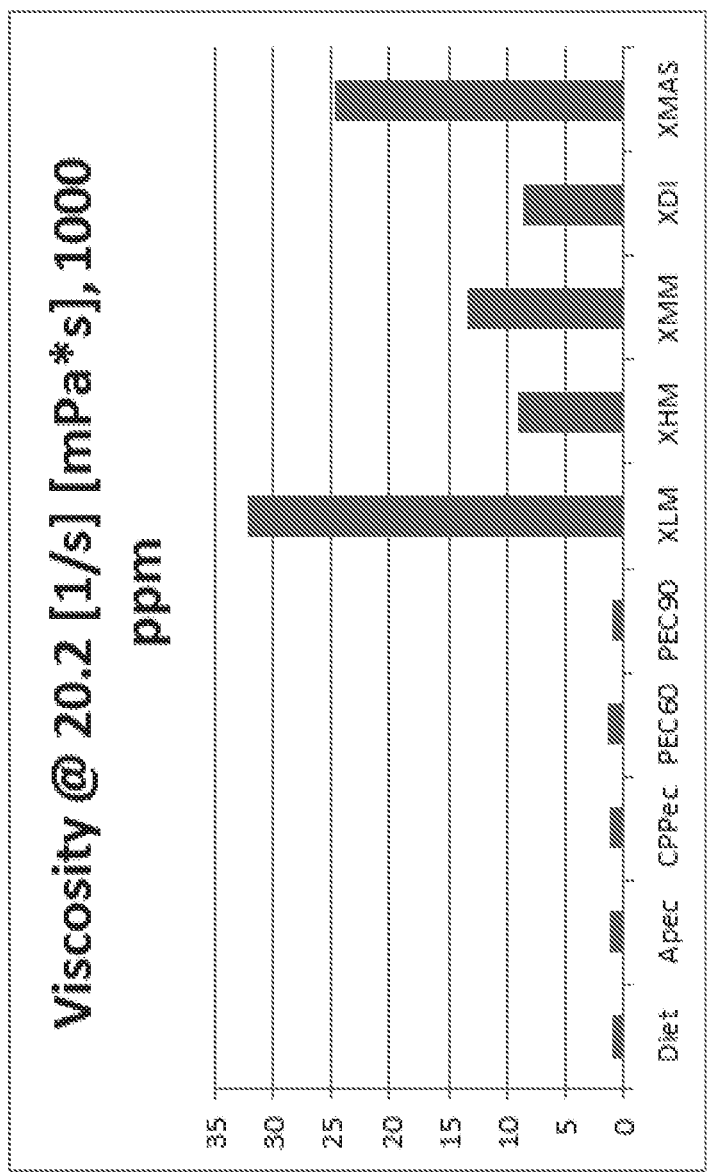
FIG. 3 depicts a graph showing the viscosity for a diet cola base sample and various pectins and xanthan gums.
Figure 4:
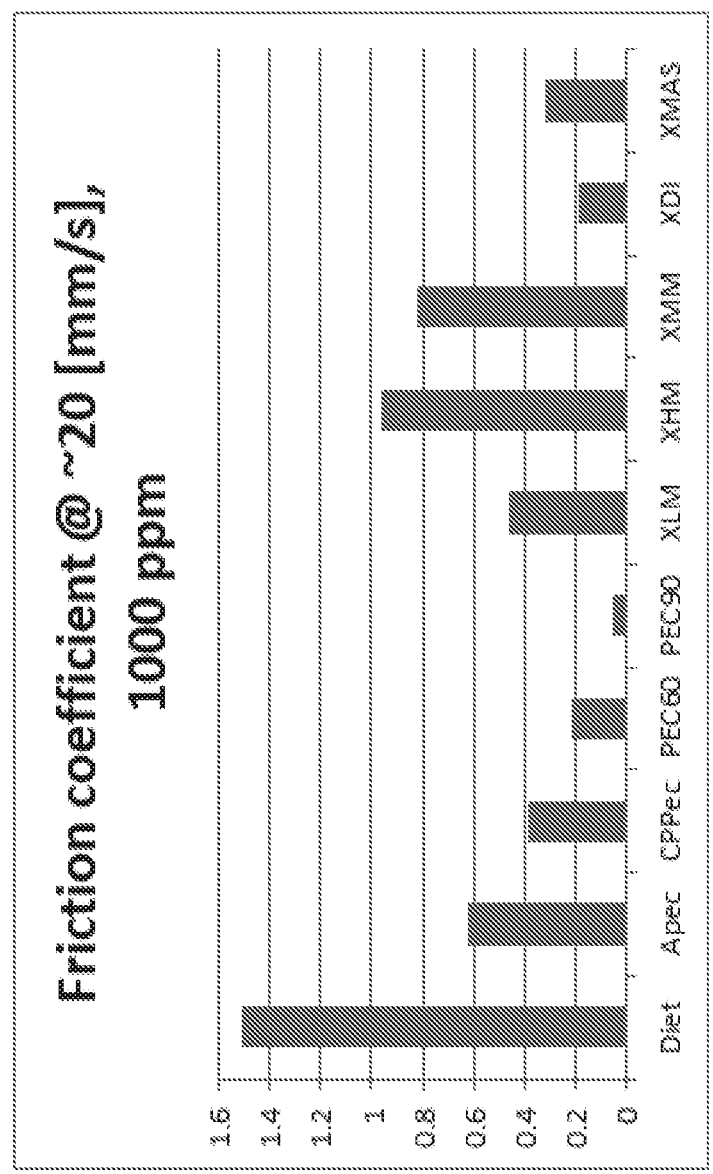
FIG. 4 depicts a graph showing the coefficient of friction for a diet cola base sample and various pectins and xanthan gums.

FIGS. 3 and 4 show that the xanthan gums have a predominant effect on viscosity, while the pectins have a predominant effect on friction. FIG. 4 also shows that apple pectin has a higher coefficient of friction, and thus, is less lubricating than citrus pectin. FIG. 4 further indicates that lubrication increases significantly as the degree of esterification ("DE") increases from PEC60 to PEC90.

Example 2—Fraction Factorial Experiment to Determine Viscosity and Friction Effects for Individual Pectins and Xanthan Gums A highly condensed fraction factorial resolution IV design experiment was conducted for four commercially available pectins and four commercially available xanthan gums to determine which pectins and/or xanthan gums have the most impact on the viscosity and coefficient of friction. Concentrates of each of the four pectins and each of the four xanthan gums listed in the table in FIG. 5 were prepared by dissolving a sufficient amount of each pectin or xanthan gum in water to obtain 5000 ppm solutions for the pectins and 10,000 ppm solutions for the xanthan gums. 19 samples were then prepared by adding sufficient amounts of the pectin concentrate or xanthan gum concentrate to 24 ml of a diet cola base prepared in accordance with the procedures described in Example 1 to obtain samples having the concentrations specified in FIG. 5.

The sample's viscosities and coefficients of friction were then measured in a randomized order in accordance with the procedures described in Example 1. The results are shown in FIG. 5. The coefficient of friction values and the viscosity values were then entered into BIOPAT MODDE software from SARTORIUS STEDIM BIOTECH GMBH to generate the PCA plot shown in FIG. 6 and the coefficient plot shown in FIG. 7.

Figure 6:
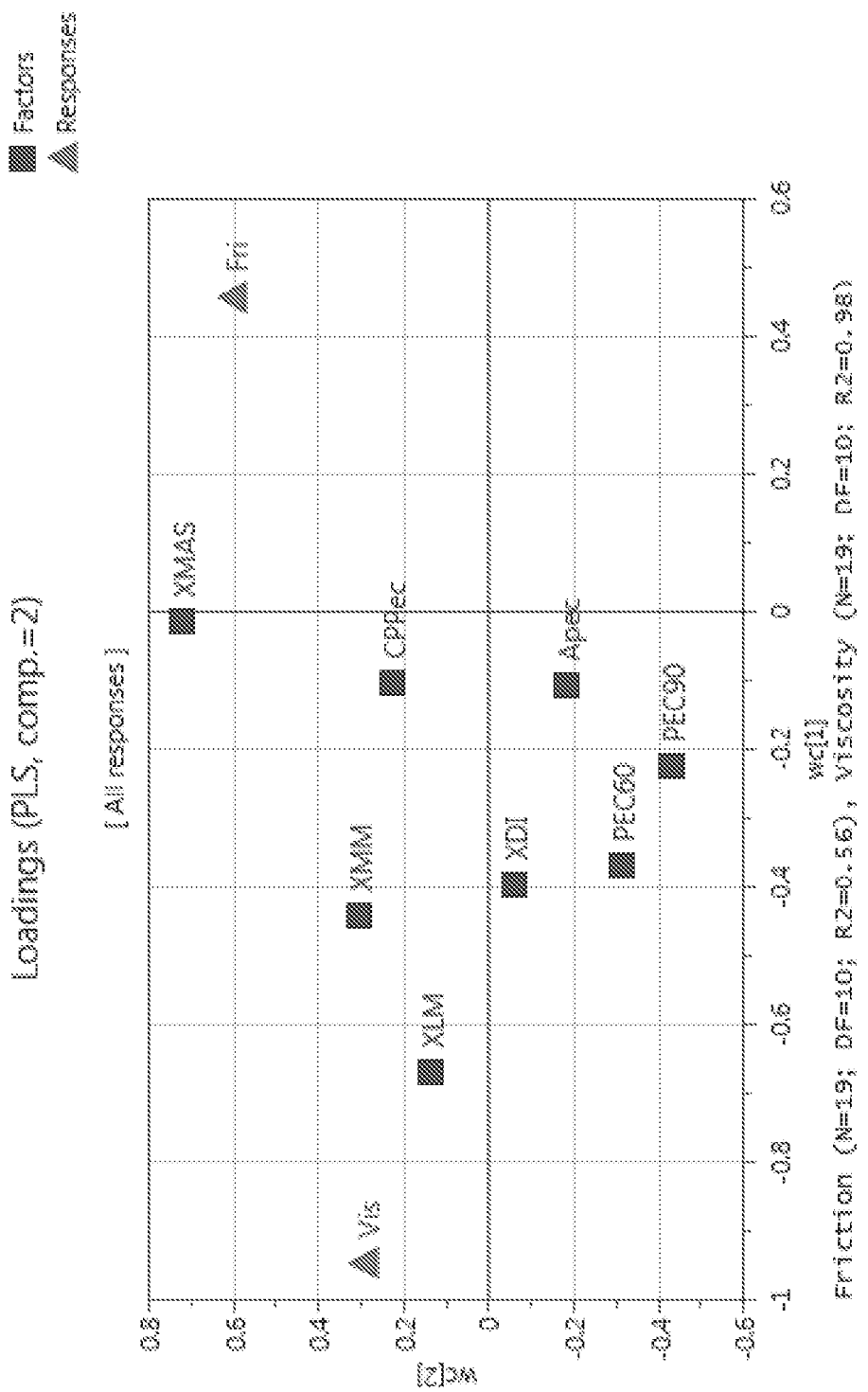
FIG. 6 is a PCA plot showing the friction-type and viscosity-type attributes for aqueous samples containing various pectins and xanthan gums.

FIG. 6 shows the friction-type and viscosity-type attributes for each of the four pectins and each of the four xanthan gums. Data points trending up on the vertical axis indicate increased friction, while data points trending down on the vertical axis indicate increased lubrication, or less friction. Similarly, data points trending to the left on the horizontal axis indicate increased viscosity, while data points trending to the right on the horizontal axis indicate decreased viscosity. Thus, according to FIG. 6, the xanthan gums exhibited viscous-type attributes, except for xanthan XMAS, which had an increasing effect on friction. FIG. 6 also shows that all four pectins exhibited at least some friction-type attributes. However, the friction-type attributes diminished for the pectins (that is, they become more lubricating) as the degree of esterification increased. For example, PEC90 with a higher degree of esterification exhibited more lubricating effects than did APec, PEC60, and CPPec.

Figure 7:
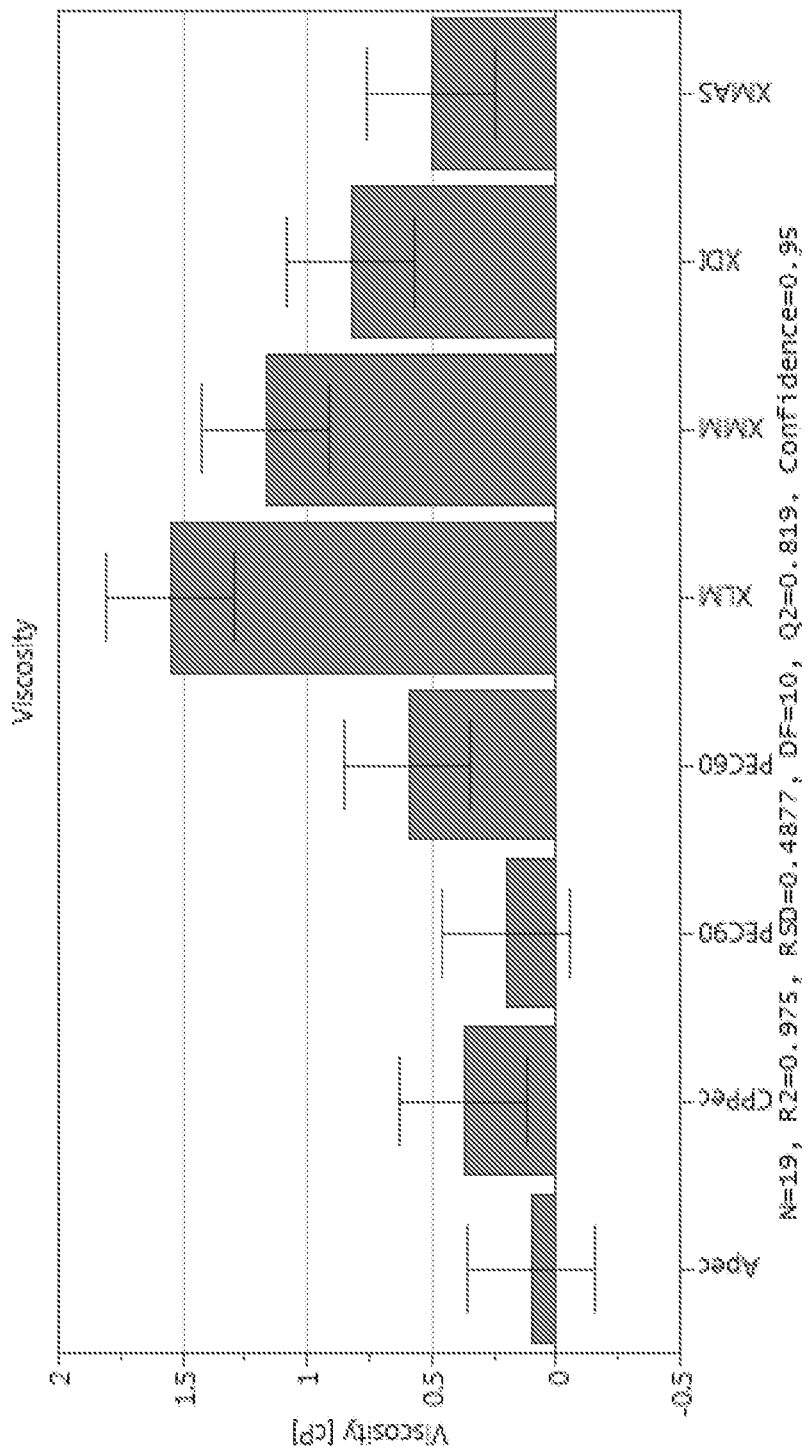
FIG. 7 depicts the viscosity for aqueous samples containing various pectins and xanthan gums.

FIG. 7 shows the viscosity for each of the four pectins and each of the four xanthan gums. Like FIG. 6, FIG. 7 indicates that the xanthan gums, with the exception of xanthan XMAS, had viscosity-type attributes.

Figure 8:
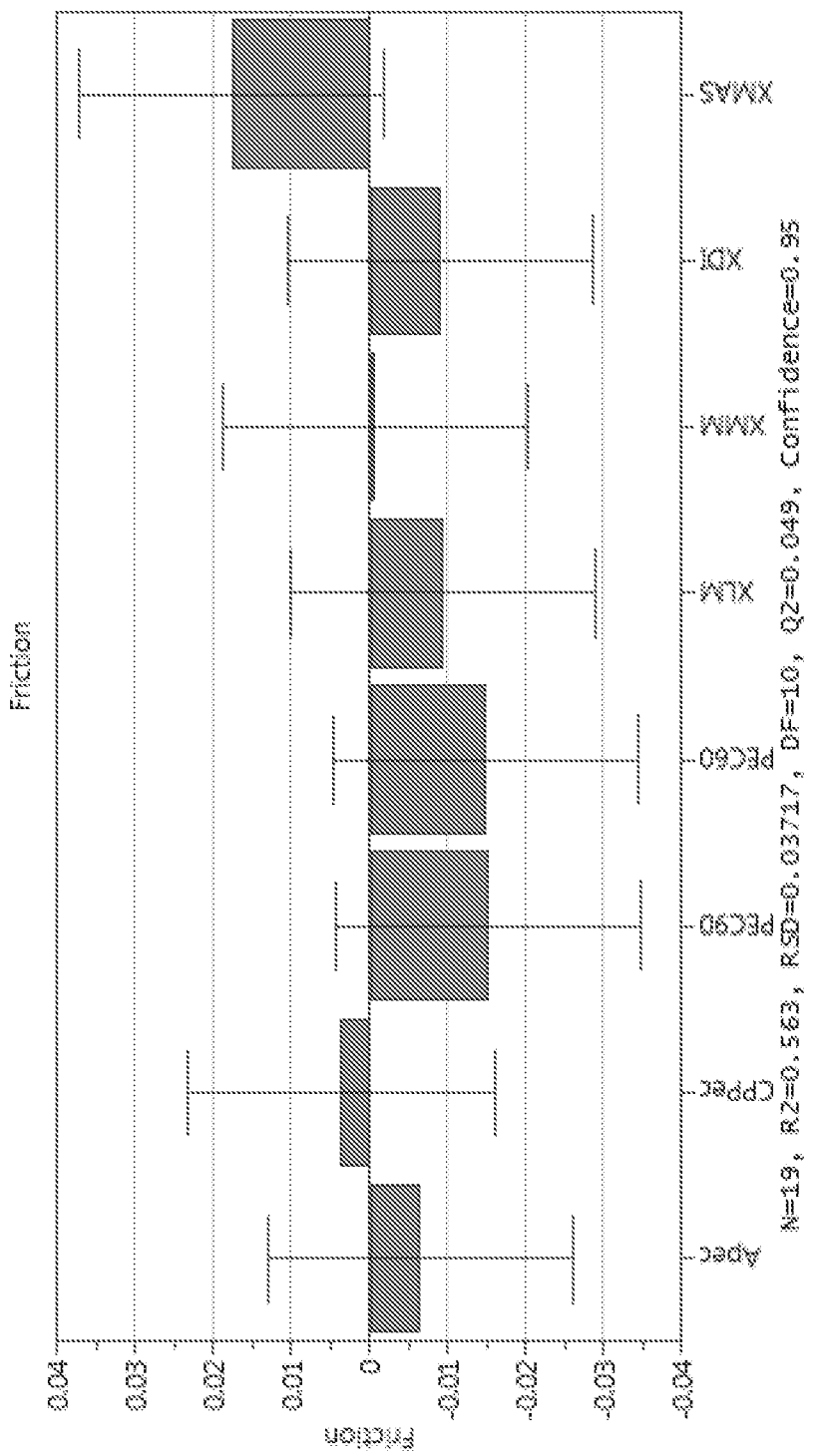
FIG. 8 depicts the coefficient of friction for aqueous samples containing various pectins and xanthan gums.

FIG. 8 shows the coefficient of friction for each of the four pectins and each of the four xanthan gums. Like FIG. 6, FIG. 8 indicates that pectins with higher degrees of esterification tended to be more lubricating.

Example 3—D-Optimal Design Experiment to Determine Viscosity and Friction Effects for Mixtures of Individual Pectins and Xanthan Gums Viscosity and friction effects were determined for the mixtures listed in Table 4. A regular cola base sample was prepared by adding 152.22 g high fructose corn syrup, 0.6437 g 80% phosphoric acid, and 0.0723 g anhydrous citric acid to 1000 ml treated water and stirring. A diet cola base sample was prepared in accordance with the procedures described in Example 1. A "gold" cola base sample was prepared by adding 0.087 g of rebaudioside A (Reb A 95), 0.2 g 80% phosphoric acid, and 28.55 g sucrose to 1000 ml treated water and stirring.

Concentrates of each of the pectins and each of the xanthan gums listed in Table 4 were prepared by dissolving a sufficient amount of each pectin or xanthan gum in water to obtain 2000 ppm solutions for the pectins and 1000 ppm solutions for the xanthan gums. 20 samples were then prepared by adding sufficient amounts of the pectin concentrate or xanthan gum concentrate to an appropriate volume of the diet cola base sample to obtain beverage samples having the concentrations specified in Table 4.

The viscosities and coefficients of friction for the base samples and experimental samples were then measured in accordance with the procedures described in Example 1. The results are shown in Tables 4 and 5 and in FIGS. 9-15.

TABLE 4

| No. | Run Order | APec (ppm) | Xanthan XMAS (ppm) | PEC90 (ppm) | Xanthan XMM (ppm) | Coefficient of Friction | Viscosity |
|---|---|---|---|---|---|---|---|
| 29 | 19 | 100 | 0 | 0 | 0 | 0.751567 | 0.93413 |
| 30 | 8 | 300 | 0 | 0 | 0 | 0.934886 | 0.89899 |
| 31 | 6 | 100 | 100 | 0 | 0 | 1.03129 | 1.75947 |

TABLE 4-continued

| No. | Run Order | APec (ppm) | Xanthan XMAS (ppm) | PEC90 (ppm) | Xanthan XMM (ppm) | Coefficient of Friction | Viscosity |
|---|---|---|---|---|---|---|---|
| 32 | 1 | 300 | 100 | 0 | 0 | 0.757344 | 1.84377 |
| 33 | 18 | 100 | 0 | 300 | 0 | 0.385422 | 0.91235 |
| 34 | 5 | 300 | 0 | 300 | 0 | 0.617517 | 0.954 |
| 35 | 11 | 100 | 100 | 300 | 0 | 0.526647 | 1.87423 |
| 36 | 14 | 300 | 100 | 300 | 0 | 0.452025 | 1.90187 |
| 37 | 2 | 100 | 0 | 0 | 100 | 0.983808 | 1.2875 |
| 38 | 10 | 300 | 0 | 0 | 100 | 0.772714 | 1.35723 |
| 39 | 4 | 100 | 100 | 0 | 100 | 0.946561 | 2.41003 |
| 40 | 3 | 300 | 100 | 0 | 100 | 0.859728 | 2.49917 |
| 41 | 17 | 100 | 0 | 300 | 100 | 0.548456 | 1.37093 |
| 42 | 13 | 300 | 0 | 300 | 100 | 0.60525 | 1.43343 |
| 43 | 12 | 100 | 100 | 300 | 100 | 0.558514 | 2.58707 |
| 44 | 9 | 300 | 100 | 300 | 100 | 0.527786 | 2.61173 |
| 45 | 16 | 200 | 50 | 150 | 50 | 0.689458 | 1.62567 |
| 46 | 7 | 200 | 50 | 150 | 50 | 0.730294 | 1.57333 |
| 47 | 15 | 200 | 50 | 150 | 50 | 0.786394 | 1.6182 |
| 48 | 20 | 200 | 50 | 150 | 50 | 0.699003 | 1.58367 |

TABLE 5

| Base Sample | Coefficient of Friction | Viscosity |
|---|---|---|
| Regular | 1.22865 | 1.18933 |
| Diet | 1.060286 | 0.8691 |
| Gold | 1.084792 | 0.93714 |

Figure 9:
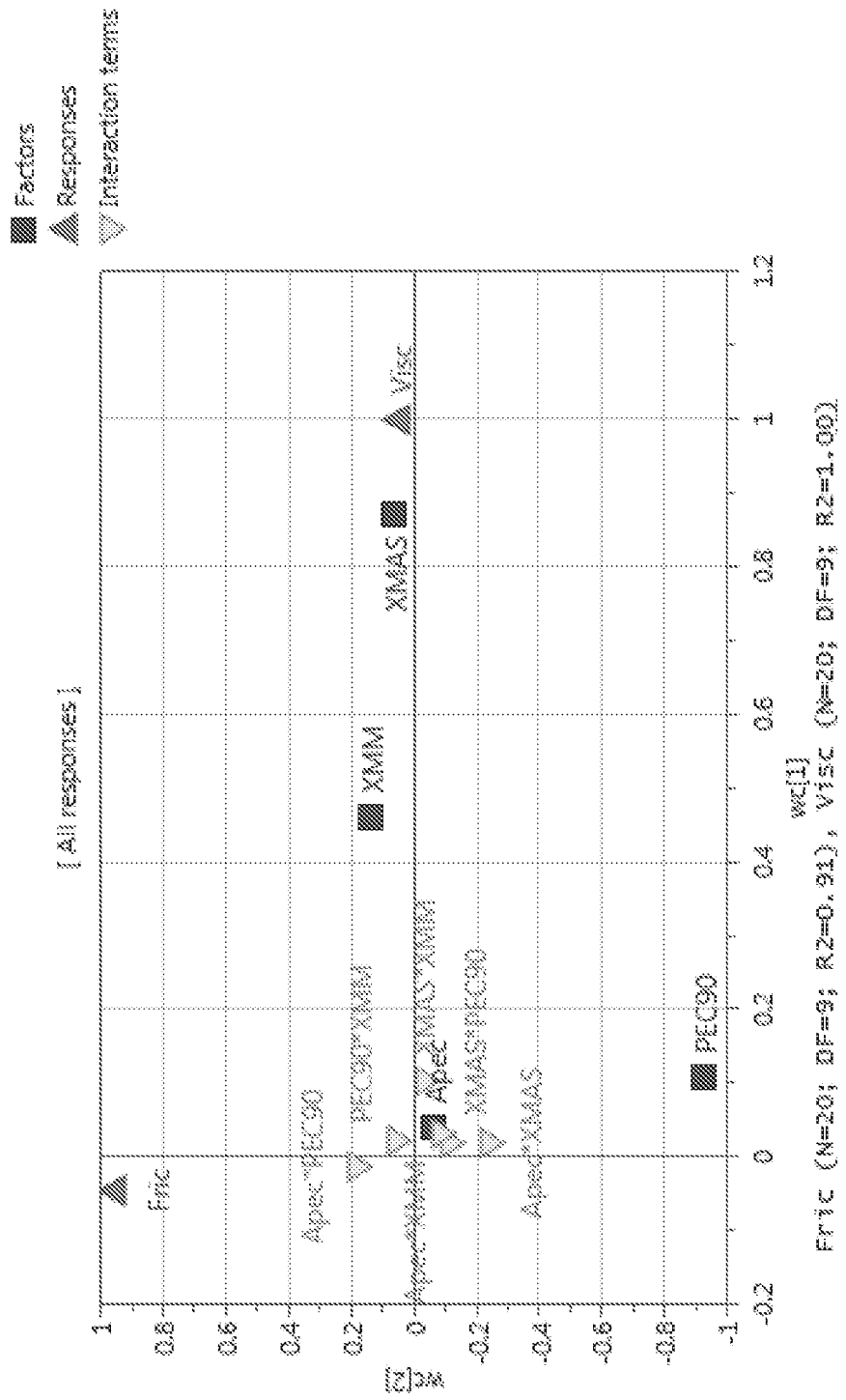
FIG. 9 is a PCA plot showing the friction-type and viscosity-type attributes for aqueous samples containing combinations of pectins and xanthan gums.

FIG. 9 shows that pectins having a high degree of esterification were more lubricating and that apple pectin exhibited a more neutral character at the concentrations listed in Table 4 in that it does not exhibit large viscosity-type or friction-type attributes. FIG. 9 also shows that both xanthan XMM and xanthan XMAS exhibit viscosity-type attributes. FIG. 9 further shows that the tested blends exhibit a more neutral character and mask the more extreme viscosity-type and friction-type attributes shown by the individual pectins and xanthan gums.

Figure 10:
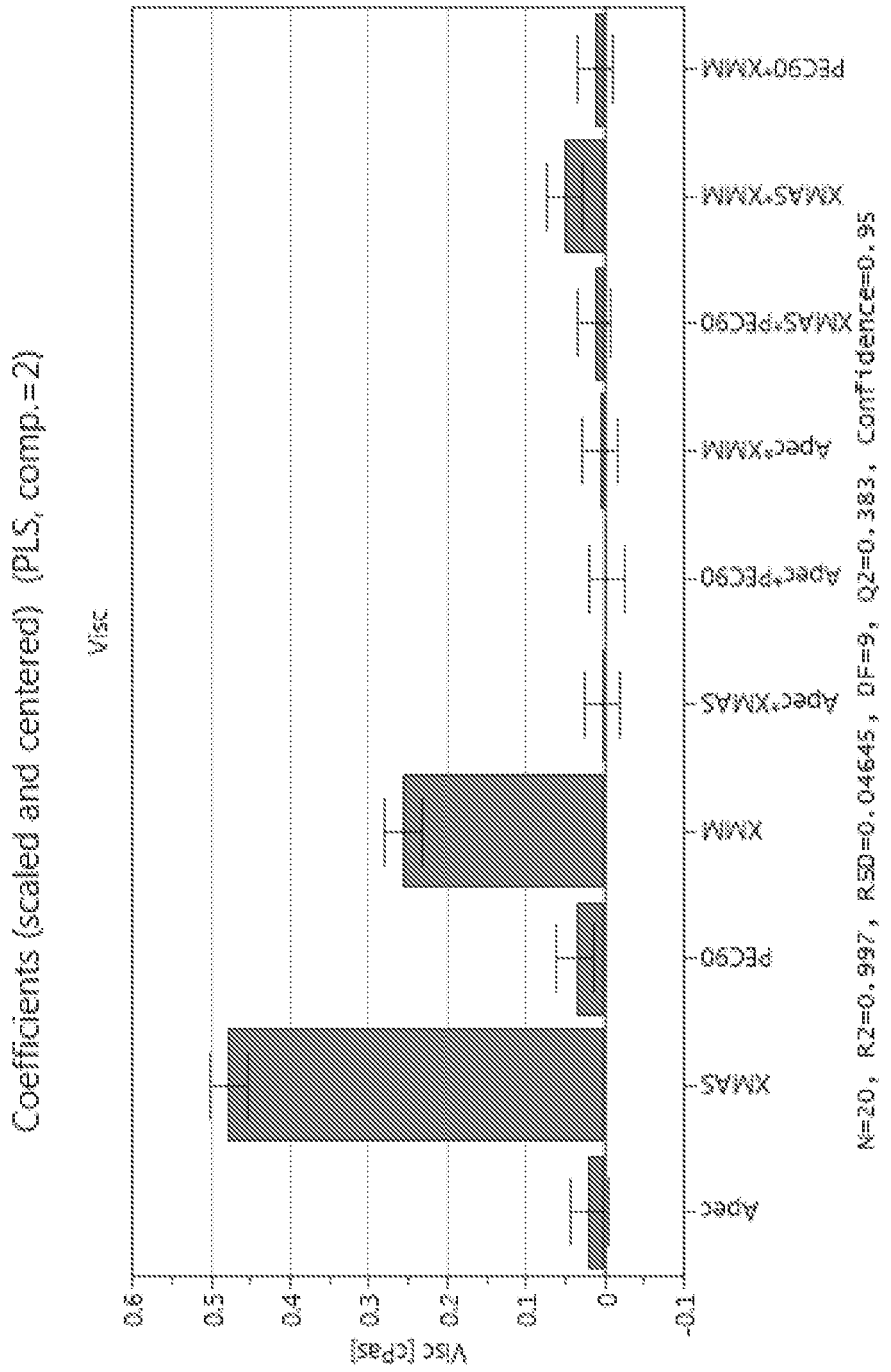
FIG. 10 depicts the viscosity for aqueous samples of individual pectins, individual xanthan gums, and combinations thereof.
Figure 11:
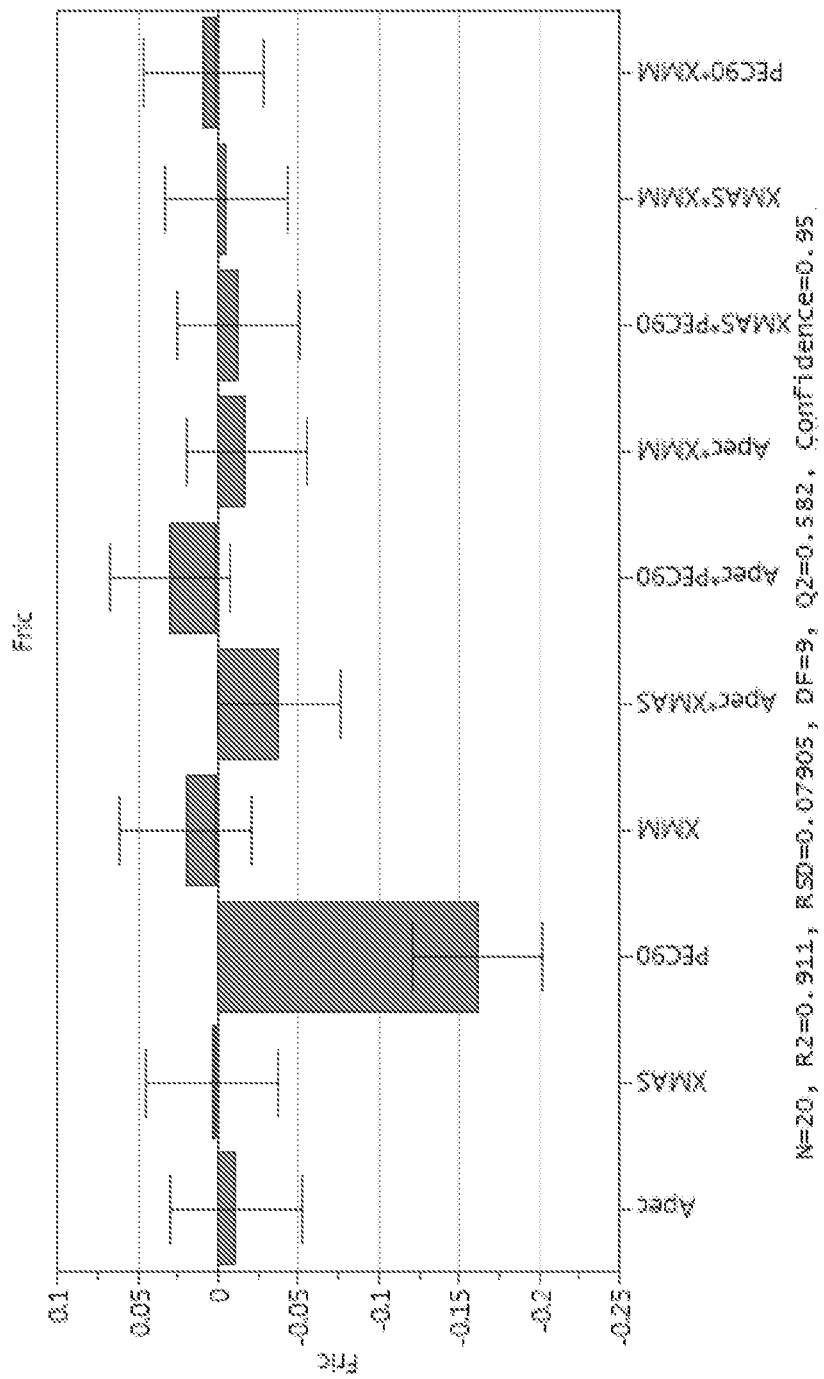
FIG. 11 depicts the coefficient of friction for aqueous samples of individual pectins, individual xanthan gums, and combinations thereof.

FIGS. 10 and 11 show the highly lubricating character of pectin with a high degree of esterification (PEC90) and the large viscosity-type attributes of both xanthan XMM and xanthan XMAS.

Figure 12:
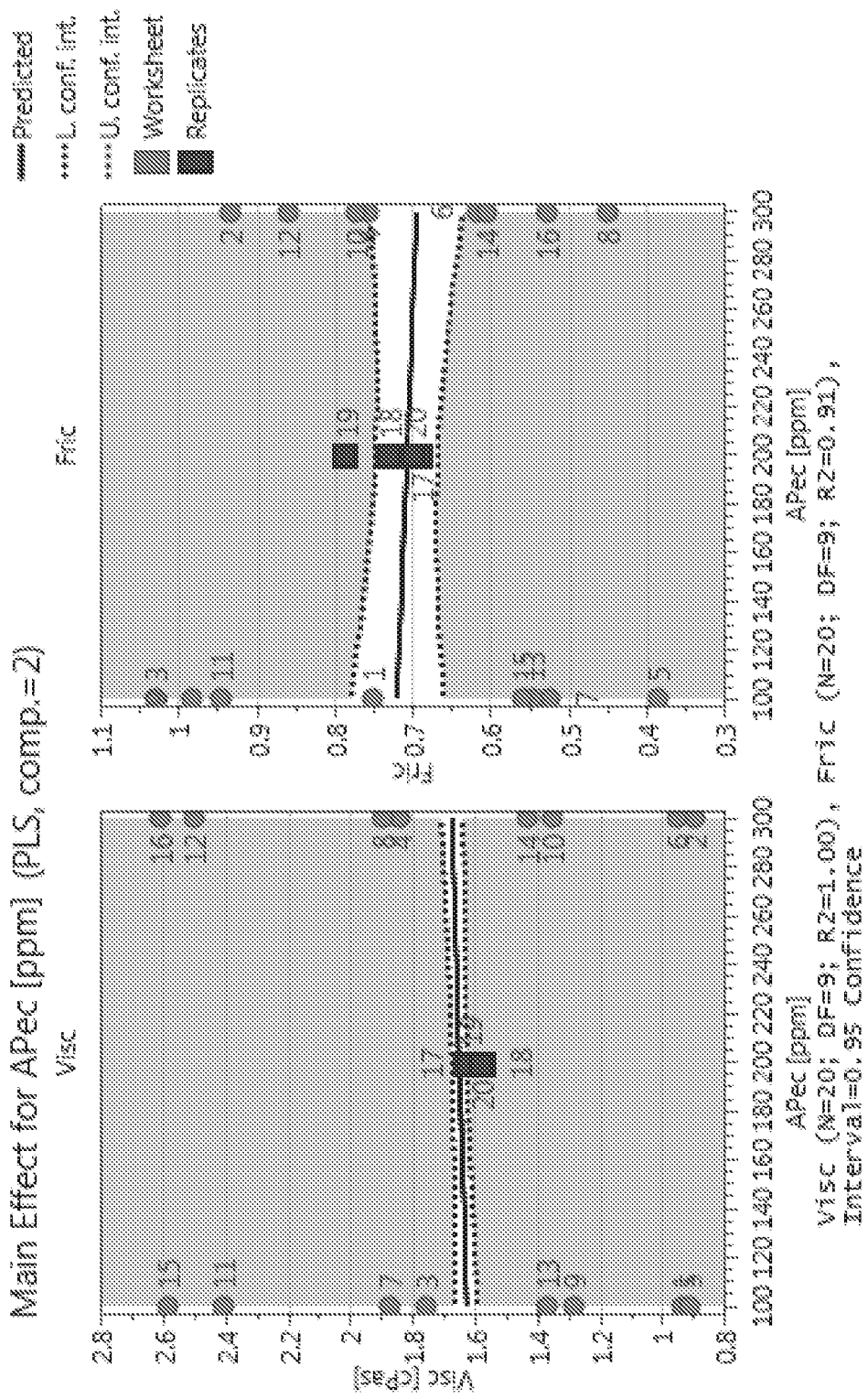
FIG. 12 depicts graphs showing the change in viscosity and coefficient of friction for differing concentrations of apple pectin.

FIG. 12 shows that the viscosity-type attributes and the friction-type attributes only change marginally as the concentration of apple pectin increases. For example, FIG. 12 indicates that the friction-type attributes marginally decrease while the viscosity-type attributes marginally increase as the concentration of apple pectin increases.

Figure 13:
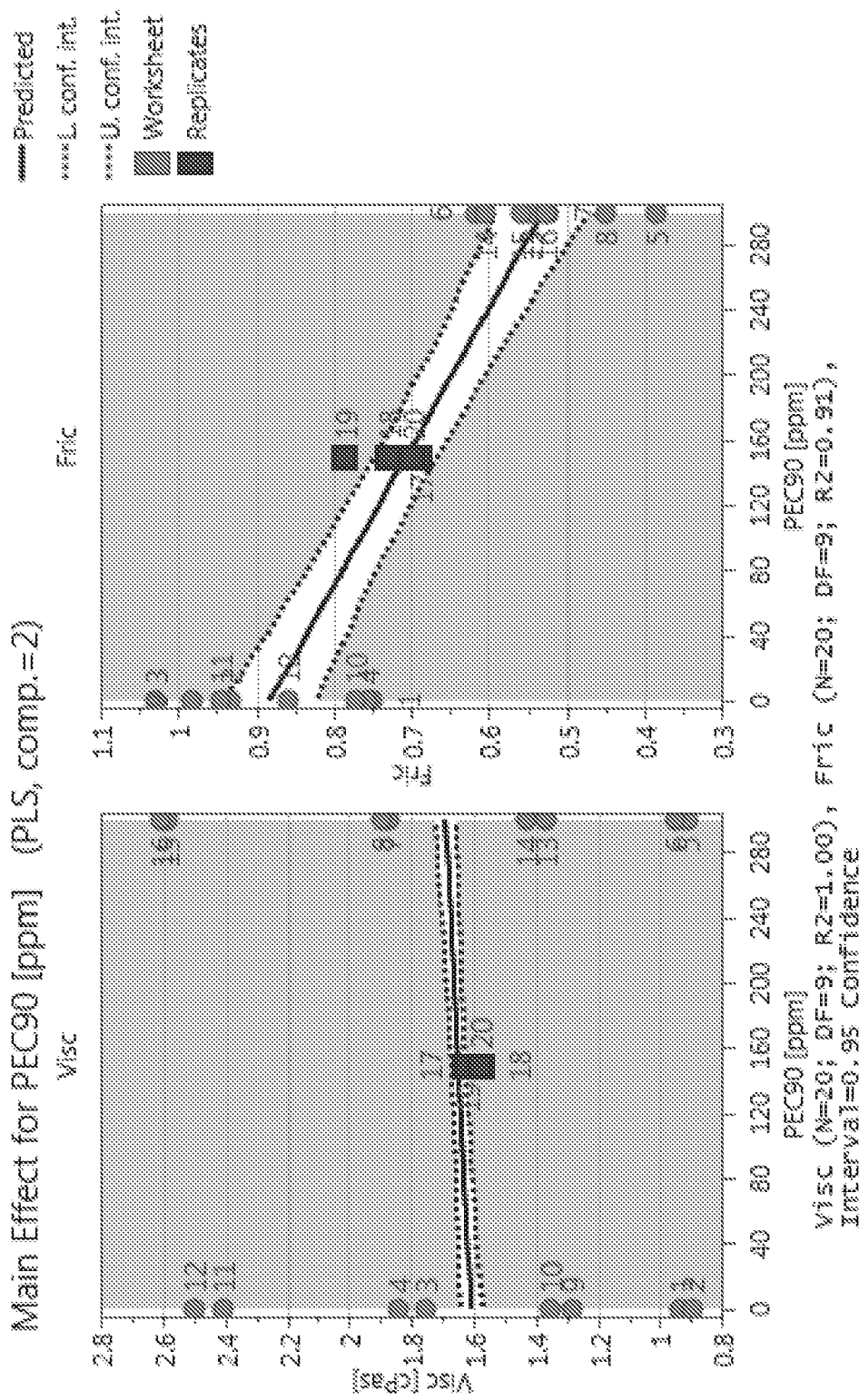
FIG. 13 depicts graphs showing the change in viscosity and coefficient of friction for differing concentrations of citrus pectin PEC90.

FIG. 13 shows that the viscosity-type attributes of citrus pectin (PEC90) only increases marginally with increasing concentration. However, FIG. 13 also indicates that friction-type attributes significantly decrease (becomes more lubricating) as the concentration of citrus pectin (PEC90) increases.

Figure 14:
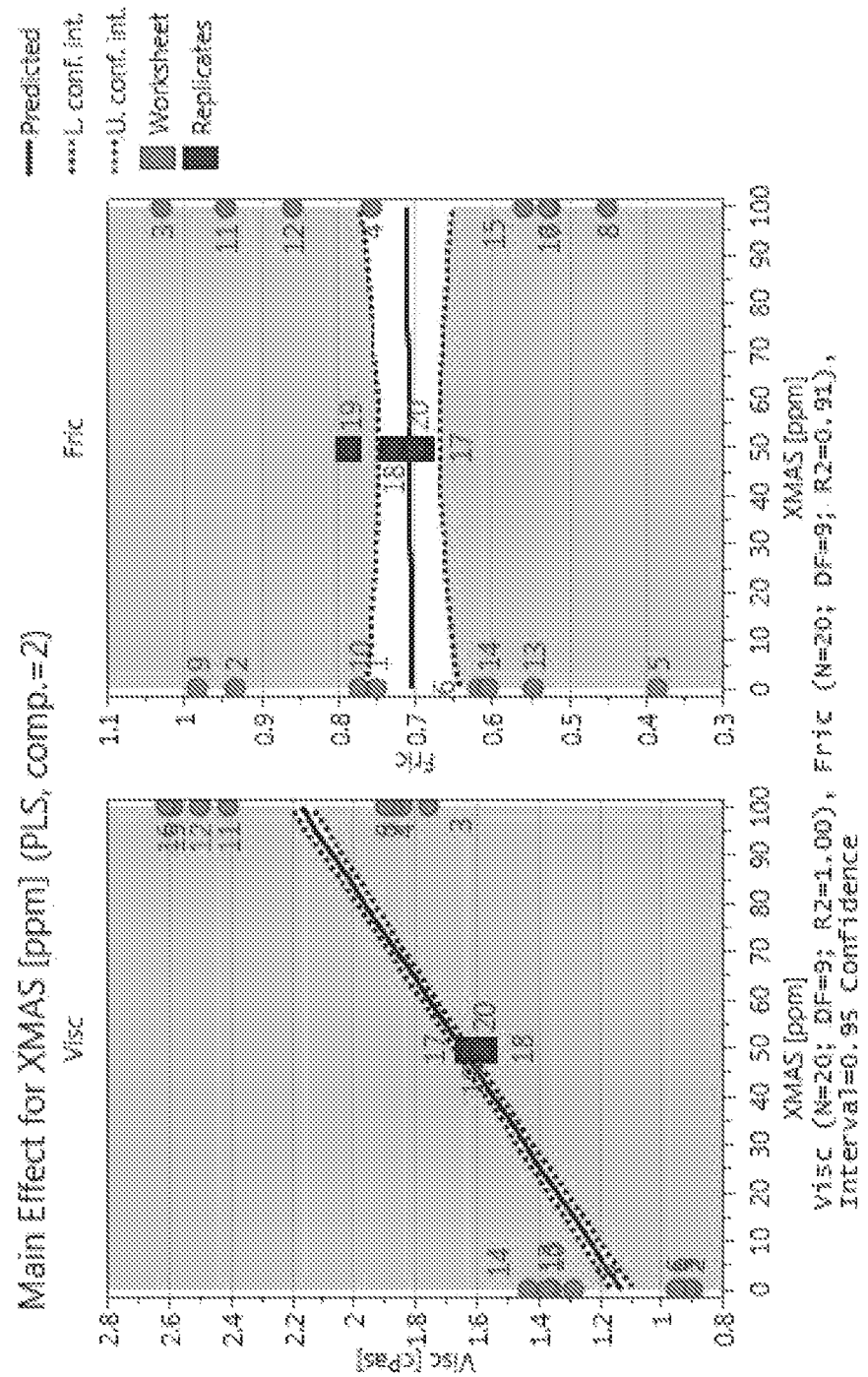
FIG. 14 depicts graphs showing the change in viscosity and coefficient of friction for differing concentrations of xanthan XMAS.

FIG. 14 shows that the viscosity-type attributes for xanthan XMAS significantly increase with increasing concentration, while the friction-type attributes remain unchanged.

Figure 15:
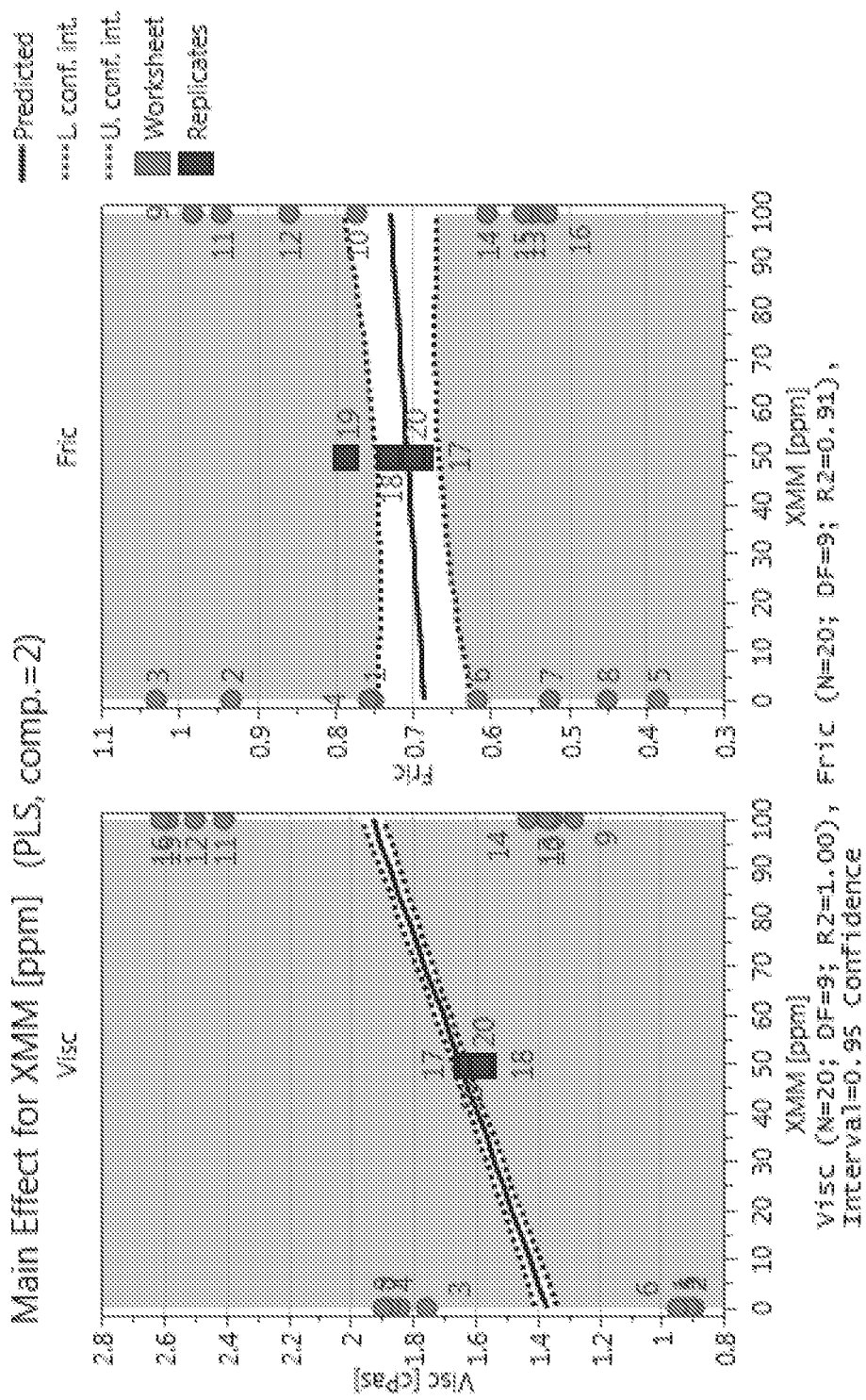
FIG. 15 depicts graphs showing the change in viscosity and coefficient of friction for differing concentrations of xanthan XMM.

FIG. 15 shows that the viscosity-type attributes for xanthan XMM increase with increasing concentration, but at a slower rate than shown in FIG. 13 with xanthan XMAS. FIG. 15 also indicates that increasing the concentration of xanthan XMM only marginally increases the friction-type attributes.

Example 4—Predictive Blending Using Computer Modeling

Multivariate data analysis (MVDA) batch process computer modeling programs BIOPAT MODDE and BIOPAT SIMCA from SARTORIUS STEDIM BIOTECH GMBH were used to predict concentration effects on viscosity-type and friction-type attributes for apple pectin (APec), citrus pectin (PEC90), xanthan XMAS, xanthan XMM, and combinations thereof. Each program was set to target the viscosity and friction of regular cola with run iterations that would lead to blends with viscosity and friction values as close to regular cola as possible. The results are shown in FIGS. 16-19.

The modeling results shown in FIGS. 16-19 predict a sharp increase in viscosity-type attributes from xanthan XMAS and a more gradual increase in viscosity-type attributes from xanthan XMM as their respective concentrations increase. FIGS. 16-19 also predict a sharp decrease in friction-type attributes as the concentration of citrus pectin (PEC90) increases.

Figure 16:
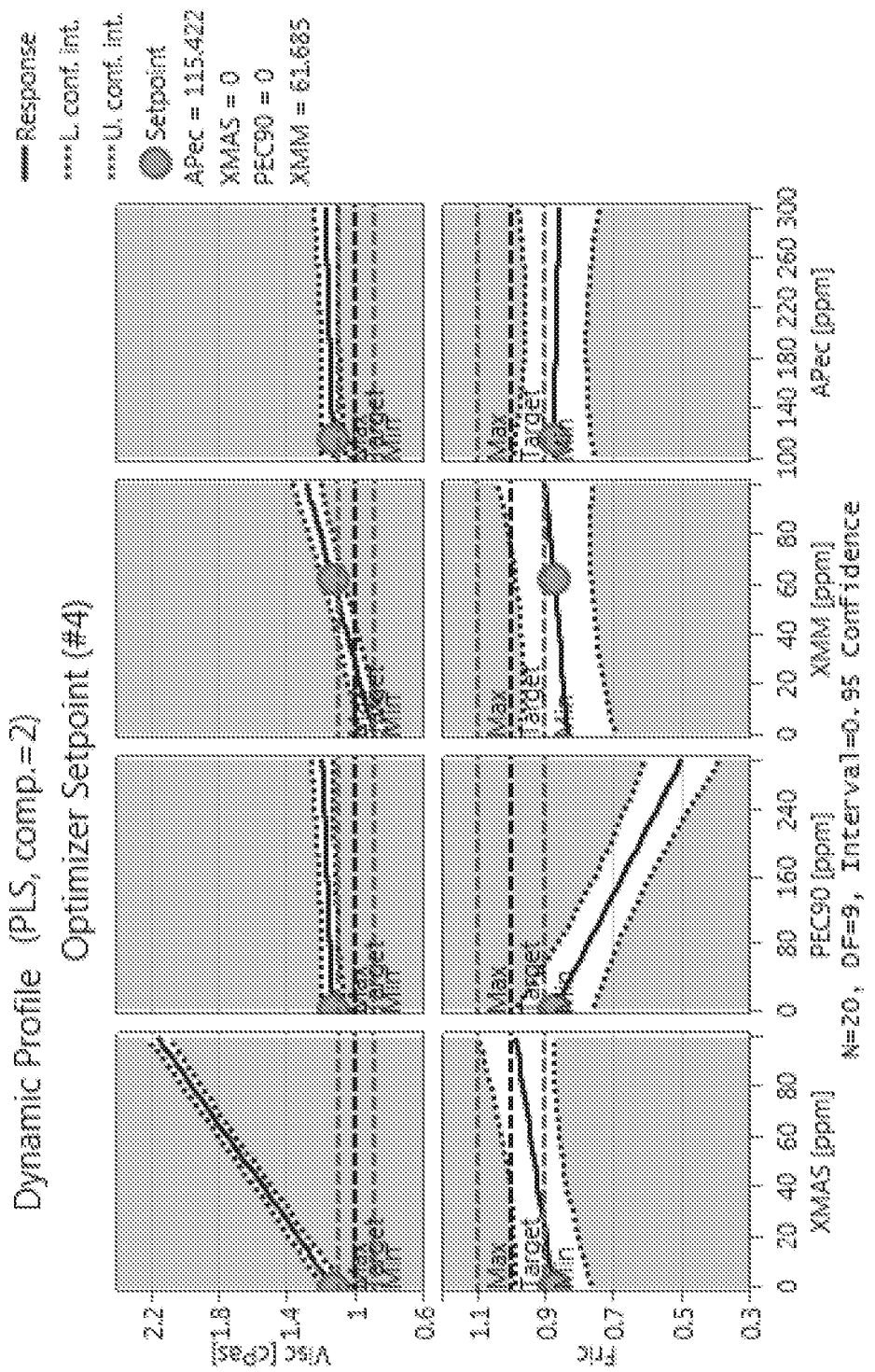
FIG. 16 depicts graphs generated by computer modeling showing predictive changes in viscosity and coefficient of friction for blends containing varying concentrations of apple pectin (APec), citrus pectin (PEC90), xanthan XMAS, and xanthan XMM.
Figure 17:
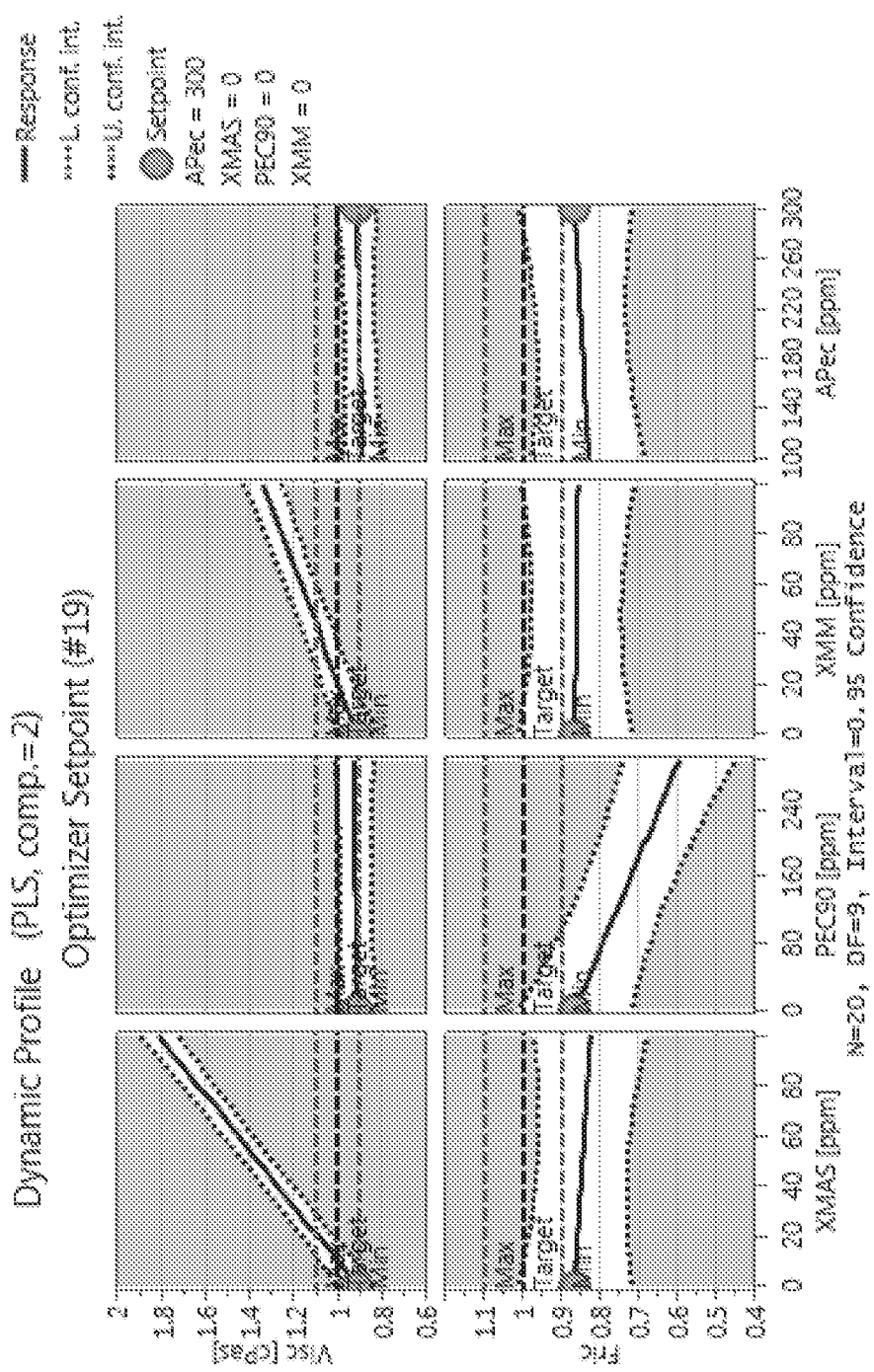
FIG. 17 depicts graphs generated by computer modeling showing predictive changes in viscosity and coefficient of friction for blends containing varying concentrations of apple pectin (APec), citrus pectin (PEC90), xanthan XMAS, and xanthan XMM.
Figure 18:
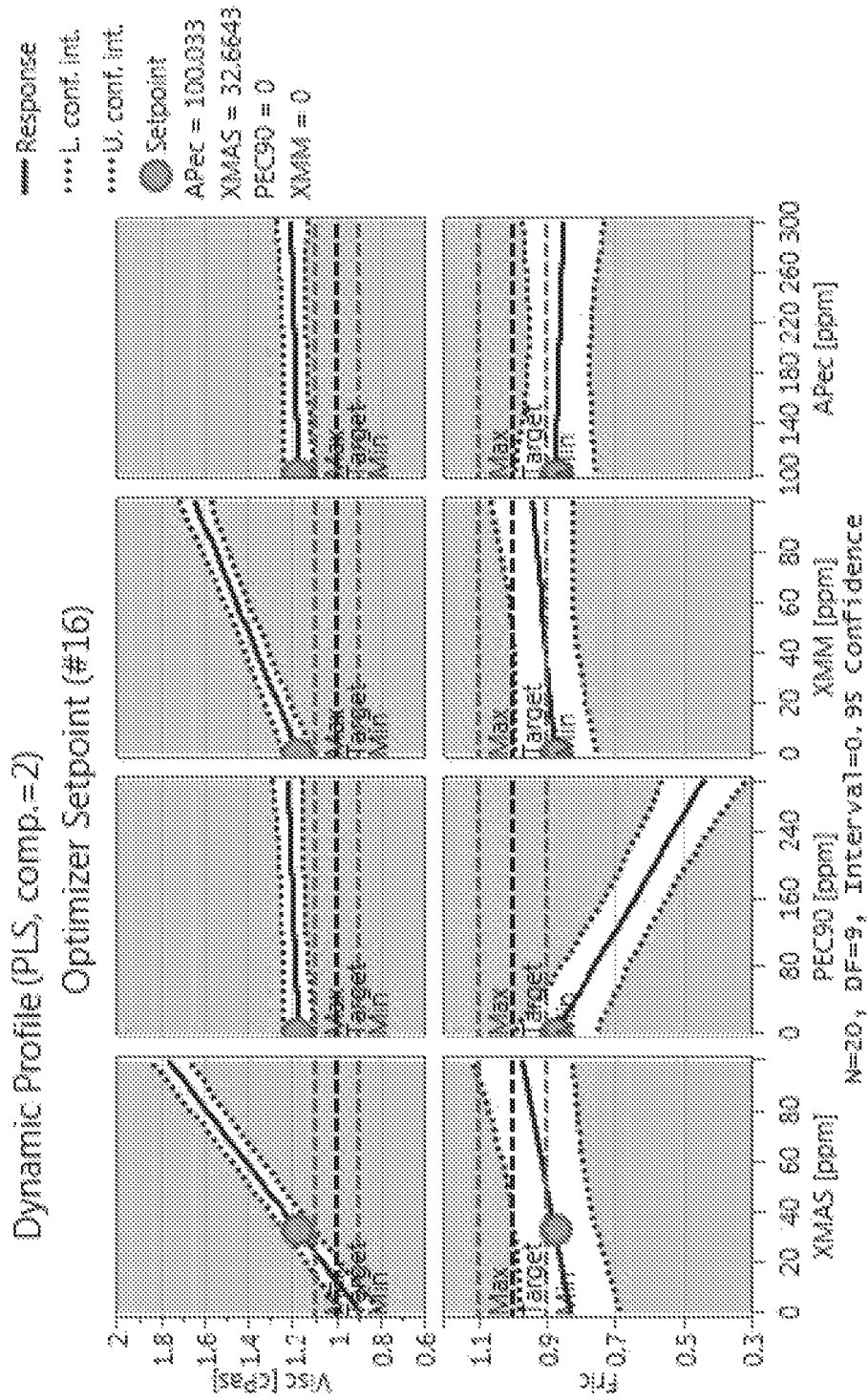
FIG. 18 depicts graphs generated by computer modeling showing predictive changes in viscosity and coefficient of friction for blends containing varying concentrations of apple pectin (APec), citrus pectin (PEC90), xanthan XMAS, and xanthan XMM.
Figure 19:
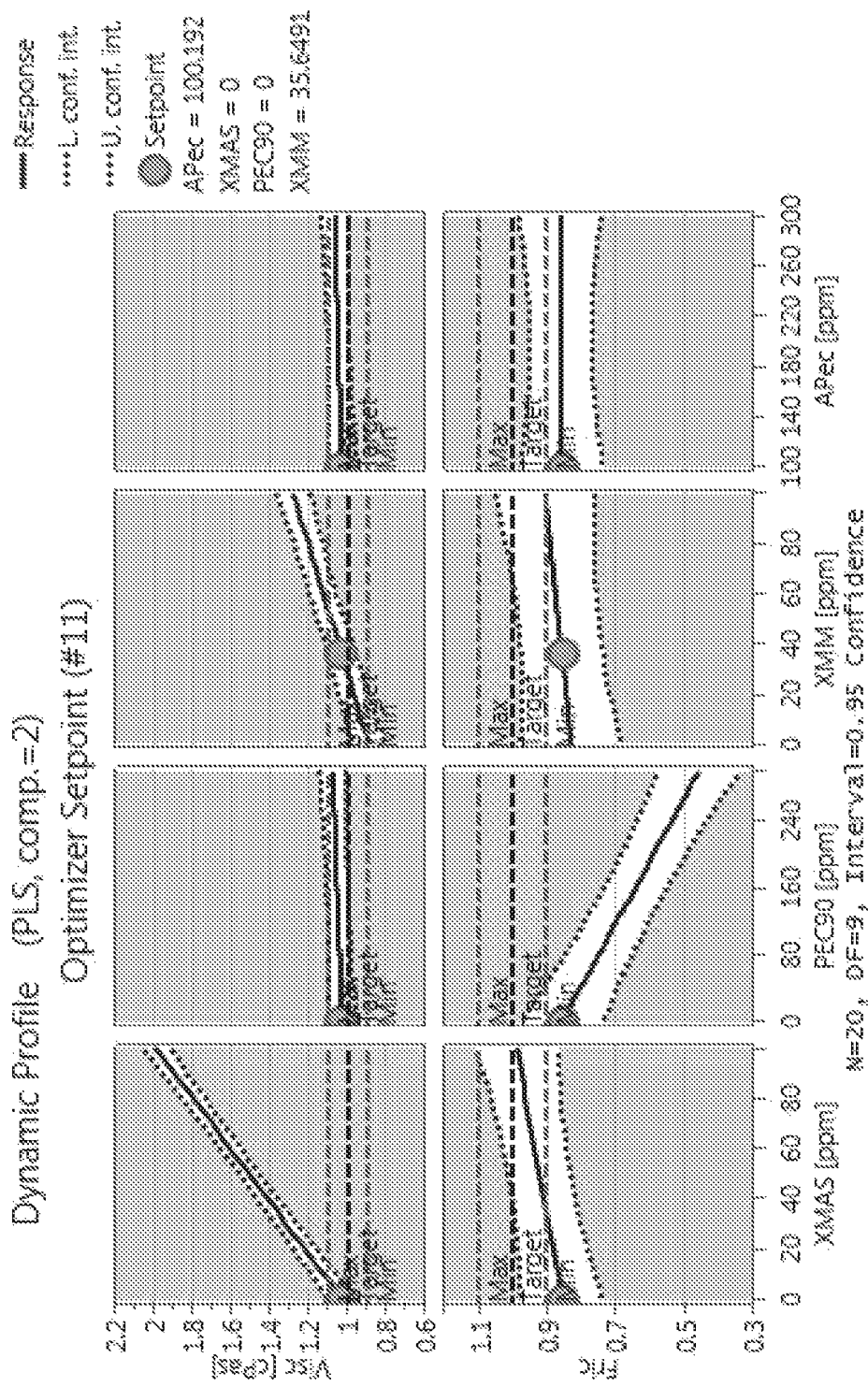
FIG. 19 depicts graphs generated by computer modeling showing predictive changes in viscosity and coefficient of friction for blends containing varying concentrations of apple pectin (APec), citrus pectin (PEC90), xanthan XMAS, and xanthan XMM.

FIG. 16 indicates that apple pectin at about 115 ppm and xanthan XMM at about 62 ppm would result in a diet cola base sample having a coefficient of friction (about 0.9) and a viscosity (about 1.1 cP) similar to a regular cola base sample. FIG. 17 predicts that apple pectin at 300 ppm may be sufficient by itself to mimic the coefficient of friction and viscosity of a regular cola base sample, even though the viscosity may be a bit low. Conversely, FIG. 18 predicts that apple pectin at about 100 ppm and xanthan XMAS at about 33 ppm would result in a diet base sample with a higher viscosity than a regular cola base sample. FIG. 19 predicts that apple pectin at about 100 ppm and xanthan XMM at about 36 ppm would mimic the coefficient of friction and viscosity of a regular cola base sample.

Example 5—Blend Validation

Regular and "gold" cola bases were prepared in accordance with the procedures described in Example 3. A diet cola base was prepared in accordance with the procedures described in Example 1 and was divided into six equal portions. A combination of pectins and/or xanthan gums in the concentrations listed in Table 6 were added to five of the six diet cola base portions to produce samples for testing.

TABLE 6

| No. | Apple Pectin (APec) (ppm) | Xanthan XMAS (ppm) | Xanthan XMM (ppm) | Citrus Pectin (PEC90) (ppm) |
|---|---|---|---|---|
| 49 | 110 | | | |
| 50 | 110 | | 65 | |
| 51 | 110 | 35 | | |
| 52 | 110 | 30 | 50 | |
| 53 | | | | 110 |

The viscosity and coefficient of friction were measured for each cola base and for each sample in accordance with the procedures described in Example 13. The results are shown in Table 7 and FIG. 20.

TABLE 7

| Sample | Viscosity | Coefficient of Friction |
|---|---|---|
| Regular Cola Base Sample | 1.18933 | 1.22865 |
| Diet Cola Base Sample | 0.8691 | 1.060286 |
| Gold Cola Base Sample | 0.93714 | 1.084792 |

TABLE 7-continued

| Sample | Viscosity | Coefficient of Friction |
|---|---|---|
| 49 | 0.938553 | 0.911522 |
| 50 | 1.2181 | 1.041919 |
| 51 | 1.2587 | 1.097031 |
| 52 | 1.4123 | 1.027969 |
| 53 | 0.937573 | 0.488514 |

Figure 20:
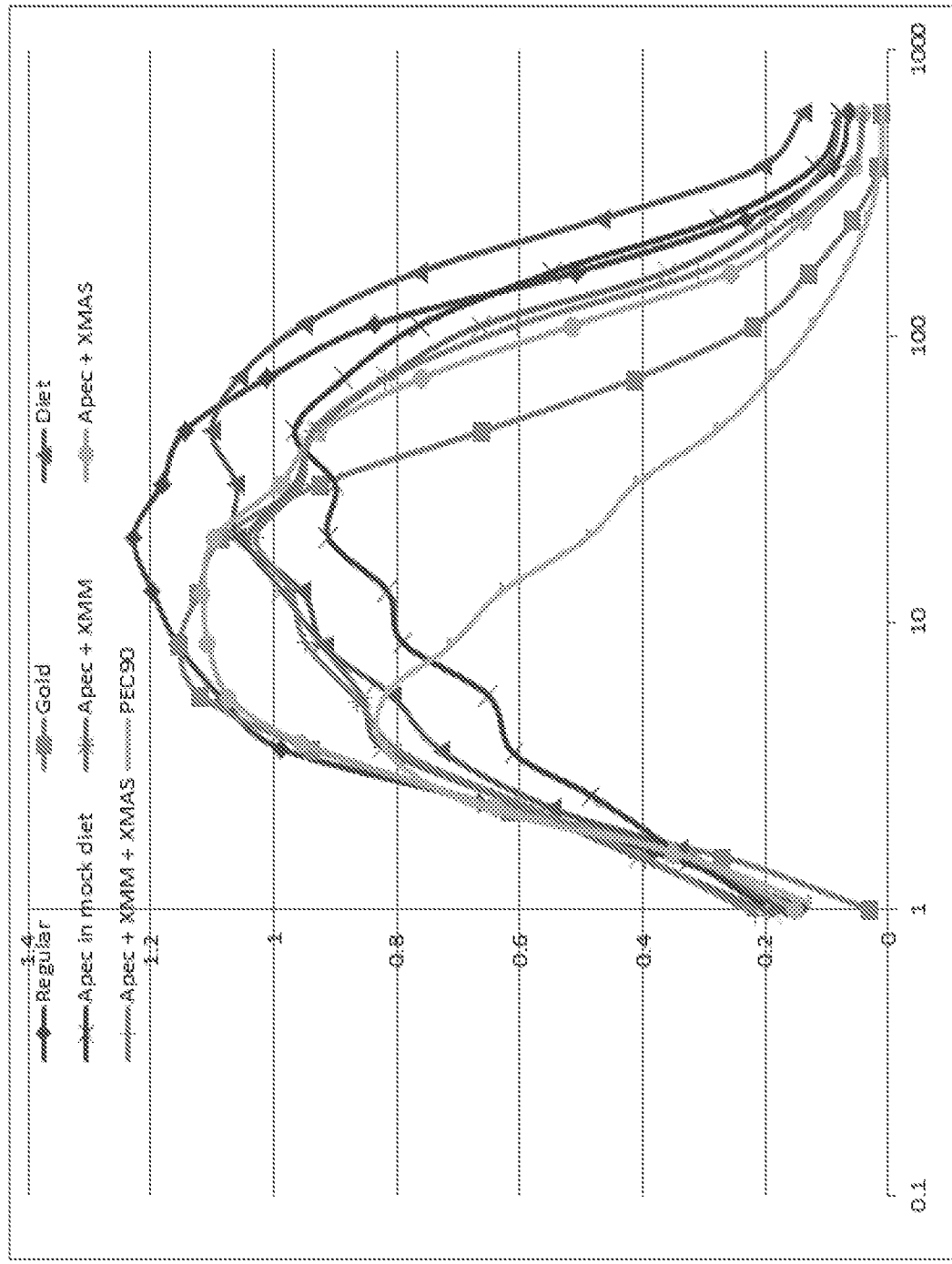
FIG. 20 is a graph showing the results of tribology experiments using blends containing apple pectin (APec), citrus pectin (PEC90), xanthan XMAS, and xanthan XMM.

FIG. 20 is a plot of the coefficient of friction (y-axis) for a given sample versus its normalized sliding speed (x-axis) in Pa*m units. The peak coefficient of friction in FIG. 20 for each tested sample is listed in Table 7 and indicates that blending apple pectin with either xanthan XMM or xanthan XMAS results in a coefficient of friction and viscosity in a diet cola base that is similar to a regular cola base. Accordingly, when added to a diet cola base sample, the pectin and xanthan gum blends listed in Table 6 exhibit mouthfeel characteristics similar to a regular cola base sample.

What is claimed is:

1. A beverage, comprising:
   (1) a pectin having an average molecular weight ranging from about 50,000 Daltons (Da) to about 400,000 Da;
   (2) a first xanthan gum having an average molecular weight ranging from about 6,000,000 Da to about 10,000,000 Da;
   (3) a non-nutritive sweetener; and
   (4) water;
   wherein the beverage has a viscosity ranging from about 1.0 cP to about 1.5 cP; and a coefficient of friction ranging from about 0.9 to about 1.4.

2. The beverage of claim 1, wherein the pectin is selected from the group consisting of apple pectins, citrus pectins, grape pectins, and carrot pectins.

3. The beverage of claim 2, wherein the pectin is apple pectin.

4. The beverage of claim 1, wherein the first xanthan gum has an average molecular weight of about 6,000,000 Da or about 8,700,000 Da.

5. The beverage of claim 4, wherein the first xanthan gum has an average molecular weight of about 8,700,000 Da.

6. The beverage of claim 1, wherein the pectin has a degree of esterification ranging from about 50% to about 99%.

7. The beverage of claim 1, wherein the pectin is present in the beverage at a concentration ranging from about 50 ppm to about 4000 ppm.

8. The beverage of claim 1, wherein the first xanthan gum is present in the beverage at a concentration ranging from about 0.01 ppm to about 3000 ppm.

9. The beverage of claim 1, wherein the first xanthan gum has an average molecular weight ranging from about 7,000,000 Da to about 9,000,000 Da.

10. The beverage of claim 1, wherein the first xanthan gum has an average molecular weight ranging from about 8,000,000 Da to about 9,000,000 Da.

11. The beverage of claim 9, further comprising a second xanthan gum, wherein the second xanthan gum has an average molecular weight ranging from about 25,000,000 Da to about 40,000,000 Da.

12. The beverage of claim 11, comprising:
   (1) from about 100 ppm to about 300 ppm of the pectin;
   (2) from about 0.01 ppm to about 100 ppm of the first xanthan gum; and
   (3) from about 0.01 ppm to about 100 ppm of the second xanthan gum.

13. The beverage of claim 1, wherein the pectin has an average molecular weight ranging from about 50,000 Da to about 300,000 Da.

14. The beverage of claim 1, comprising:
   (1) from about 100 ppm to about 300 ppm of the pectin; and
   (2) from about 0.01 ppm to about 100 ppm of the first xanthan gum.

15. The beverage of claim 1, further comprising a second pectin having an average molecular weight ranging from about 50,000 Da to about 400,000 Da.

16. The beverage of claim 1, wherein the non-nutritive sweetener is selected from the group consisting of a steviol glycoside, Lo Han Guo sweetener, rubusoside, siamenoside, monatin, curculin, glycyrrhizic acid, neohesperidin, dihydrochalcone, glycyrrhizin, glycyphyllin, phloridzin, trilobatin, phyllodulcin, brazzein, hernandulcin, osladin, polypodoside A, baiyunoside, pterocaryoside A and B, mukurozioside, thaumatin, monellin, mabinlins I and II, phlomisoside I, periandrin I, abrusoside A, and cyclocarioside I, mogroside IV, mogroside V, and combinations thereof.

17. The beverage of claim 16, wherein the non-nutritive sweetener is a steviol glycoside.

18. The beverage of claim 17, wherein the steviol glycoside is selected from the group consisting of stevioside, rebaudioside A, rebaudioside B, rebaudioside C, rebaudioside D, rebaudioside E, rebaudioside F, rebaudioside G rebaudioside H rebaudioside I, rebaudioside J, rebaudioside K, rebaudioside L, rebaudioside M, rebaudioside N, rebaudioside O, rebaudioside P, rebaudioside Q, steviolbioside, dulcoside A, and combinations thereof.

19. The beverage of claim 1, wherein the beverage is a carbonated beverage, a non-carbonated beverage, a fountain beverage, a frozen beverage, a frozen carbonated beverage, a fruit juice, a fruit juice-flavored drink, a fruit-flavored drink, a cola beverage, a sports drink, an energy drink, a fortified/enhanced water drink, a flavored water, a soy drink, a vegetable drink, a grain-based drink, a malt beverage, a fermented drink, a yogurt drink, kefir, a coffee beverage, a tea beverage, a dairy beverage, a smoothie drink, a caffeinated energy drink, or an alcoholic beverage.

20. A method for increasing viscosity and coefficient of friction of a beverage, comprising adding to the beverage:
   (1) a pectin having an average molecular weight ranging from about 50,000 Da to about 400,000 Da;
   (2) a first xanthan gum having an average molecular weight ranging from about 6,000,000 Da to about 10,000,000 Da; and
   (3) a non-nutritive sweetener;
   wherein the pectin and xanthan gum are added in an amount effective to provide a viscosity ranging from about 1.0 cP to about 1.5 cP and a coefficient of friction ranging from about 0.9 to about 1.4 after the pectin and first xanthan gum are added.

* * * * *